(12) United States Patent
Zhu

(10) Patent No.: US 12,108,411 B2
(45) Date of Patent: Oct. 1, 2024

(54) METHODS AND APPARATUSES FOR CONFIGURING A CONTROL REGION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 441 days.

(21) Appl. No.: 17/593,032

(22) PCT Filed: Mar. 27, 2019

(86) PCT No.: PCT/CN2019/079919
§ 371 (c)(1),
(2) Date: Sep. 4, 2021

(87) PCT Pub. No.: WO2020/191677
PCT Pub. Date: Oct. 1, 2020

(65) Prior Publication Data
US 2022/0174650 A1    Jun. 2, 2022

(51) Int. Cl.
*H04W 72/04* (2023.01)
*H04W 72/23* (2023.01)

(52) U.S. Cl.
CPC .................. *H04W 72/23* (2023.01)

(58) Field of Classification Search
None
See application file for complete search history.

(56) References Cited

U.S. PATENT DOCUMENTS

| | | | |
|---|---|---|---|
| 2020/0187236 A1 | 6/2020 | Moon et al. | |
| 2020/0221428 A1 | 7/2020 | Moon et al. | |
| 2021/0144747 A1 | 5/2021 | Moon et al. | |
| 2021/0385677 A1* | 12/2021 | Yang | H04W 72/044 |
| 2022/0104185 A1 | 3/2022 | Moon et al. | |

FOREIGN PATENT DOCUMENTS

| | | |
|---|---|---|
| CN | 103688483 A | 3/2014 |
| CN | 106911999 A | 6/2017 |
| CN | 107453840 A | 12/2017 |
| CN | 107734593 A | 2/2018 |
| CN | 108282290 A | 7/2018 |

(Continued)

OTHER PUBLICATIONS

ISA State Intellectual Property Office of the People's Republic of China, Written Opinion of the International Searching Authority Issued in Application No. PCT/CN2019/079919, Dec. 31, 2019, WIPO, 8 pages.

(Continued)

*Primary Examiner* — Kouroush Mohebbi
(74) *Attorney, Agent, or Firm* — Syncoda LLC; Feng Ma

(57) ABSTRACT

A method for configuring a control region, performed by a base station working on an unlicensed spectrum, includes: determining one or more channel detection subbands for configuring the control region; generating control region configuration information corresponding to the one or more channel detection subbands; and transmitting the control (Continued)

region configuration information to a terminal to perform a corresponding control signaling detection based on the control region configuration information.

14 Claims, 13 Drawing Sheets

(56) References Cited

FOREIGN PATENT DOCUMENTS

| CN | 108811094 A | 11/2018 |
|---|---|---|
| CN | 109075960 A | 12/2018 |
| CN | 109309547 A | 2/2019 |
| CN | 109314848 A | 2/2019 |
| CN | 109328482 A | 2/2019 |
| CN | 109391361 A | 2/2019 |
| CN | 109451802 A | 3/2019 |
| EP | 2822339 A1 | 1/2015 |
| EP | 3461221 A1 | 3/2019 |
| KR | 20180081464 A | 7/2018 |
| WO | 2019031850 A1 | 2/2019 |
| WO | 2019042270 A1 | 3/2019 |

OTHER PUBLICATIONS

European Patent Office, Extended European Search Report Issued in Application No. 19920864.6, Oct. 17, 2022, Germany, 22 pages.
Huawei, HiSilicon, DL channels and signals in NR unlicensed band, 3GPP TSG RAN WGI Meeting #96, R1-1901523, Athens, Greece, Feb. 25-Mar. 1, 2019, 10 pages.
State Intellectual Property Office of the People's Republic of China, Office Action and Search Report Issued in Application No. 201980000542X, Jun. 2, 2021, 21 pages. (Submitted with Machine/Partial Translation).
ISA State Intellectual Property Office of the People's Republic of China, International Search Report Issued in Application No. PCT/CN2019/079919, Dec. 31, 2019, WIPO, 4 pages.
MediaTek Inc "On downlink transmission detection in NR-U", 3GPP TSG RAN WGI Aug. 24, 2018 Meeting #94 RI-1808272, Aug. 20-24, 2018, Aug. 24, 2018 ( Aug. 24, 2018), 6 pages.
Intellectual property India, Office Action Issued in Application No. 202147046838, Apr. 1, 2022, 6 pages.
Intellectual property India, Hearing Notice in Reference of Application No. 202147046838, May 30, 2024, 3 pages.

* cited by examiner

| Channel Detection Results | CORESET Configuration |
|---|---|
| Successful for channel detection subband 1, failed for channel detection subbands 2 and 3 | CORESET1 and CORESET2 |
| Successful for channel detection subband 2, failed for channel detection subbands 1 and 3 | CORESET1, CORESET2 and CORESET3 |
| Successful for channel detection subband 3, failed for channel detection subbands 1 and 2 | CORESET1 |
| Successful for channel detection subbands 1 and 2, failed for channel detection subband 3 | CORESET1 and CORESET2 |
| Successful for channel detection subbands 1 and 3, failed for channel detection subband 2 | CORESET1 and CORESET2 |
| Successful for channel detection subbands 2 and 3, failed for channel detection subband 1 | CORESET1, CORESET2 and CORESET3 |
| Successful for channel detection subbands 1, 2 and 3 | CORESET1, CORESET2 and CORESET3 |

FIG. 3A

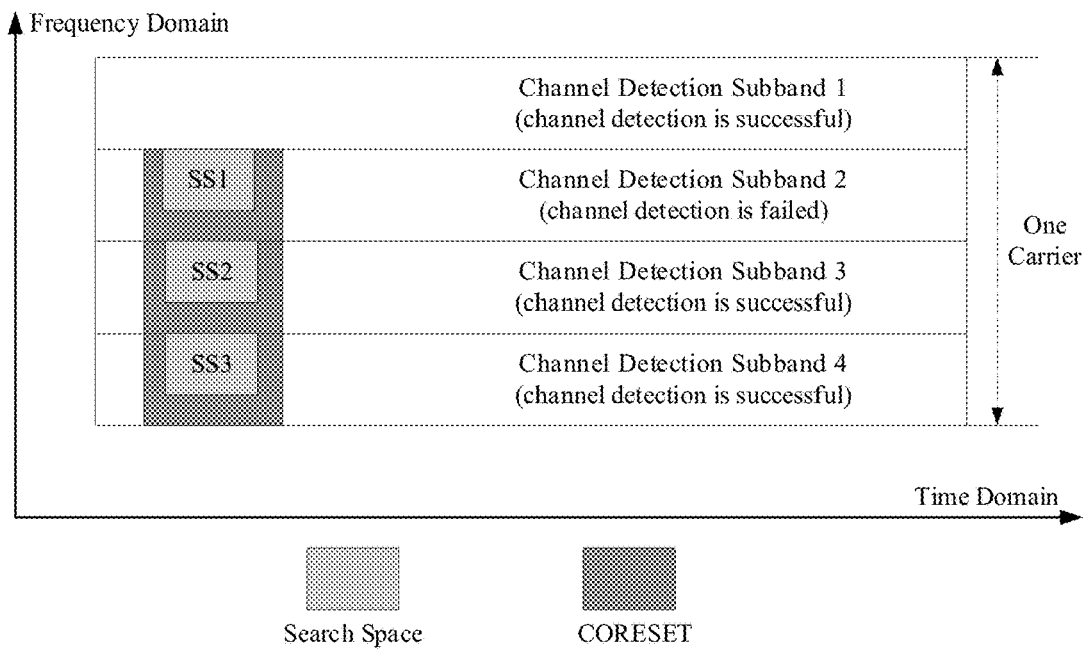

FIG. 5A

```
┌─────────────────────────────────────────────────────────────────┐
│ Configure one or more sets of PDCCH candidates corresponding to the one │
│ or more channel detection subbands, where each set of PDCCH candidates, │──610
│ in which the characteristics are identical, is limited on one of the one or │
│ more channel detection subbands, and the sets of PDCCH candidates,  │
│ between which the characteristics are different, correspond to different │
│ channel detection subbands │
└─────────────────────────────────────────────────────────────────┘
                                    │
                                    ▼
┌─────────────────────────────────────────────────────────────────┐
│ Generate second indication information for representing the one or more │──620
│ sets of PDCCH candidates configured by the base station for the one or │
│ more channel detection subbands │
└─────────────────────────────────────────────────────────────────┘
                                    │
                                    ▼
┌─────────────────────────────────────────────────────────────────┐
│ Add the second indication information into the control region configuration │──630
│ information │
└─────────────────────────────────────────────────────────────────┘
                                    │
                                    ▼
┌─────────────────────────────────────────────────────────────────┐
│ Configure a designated CORESET and a designated search space for the │──640
│ terminal, where the designated CORESET is to be mapped on a plurality of │
│ channel detection subbands, and the designated search space includes the │
│ one or more sets of PDCCH candidates with the various characteristics │
└─────────────────────────────────────────────────────────────────┘
                                    │
                                    ▼
┌─────────────────────────────────────────────────────────────────┐
│ Transmit the designated CORESET and the designated search space to the │──650
│ terminal through high layer signaling │
└─────────────────────────────────────────────────────────────────┘
```

FIG. 6

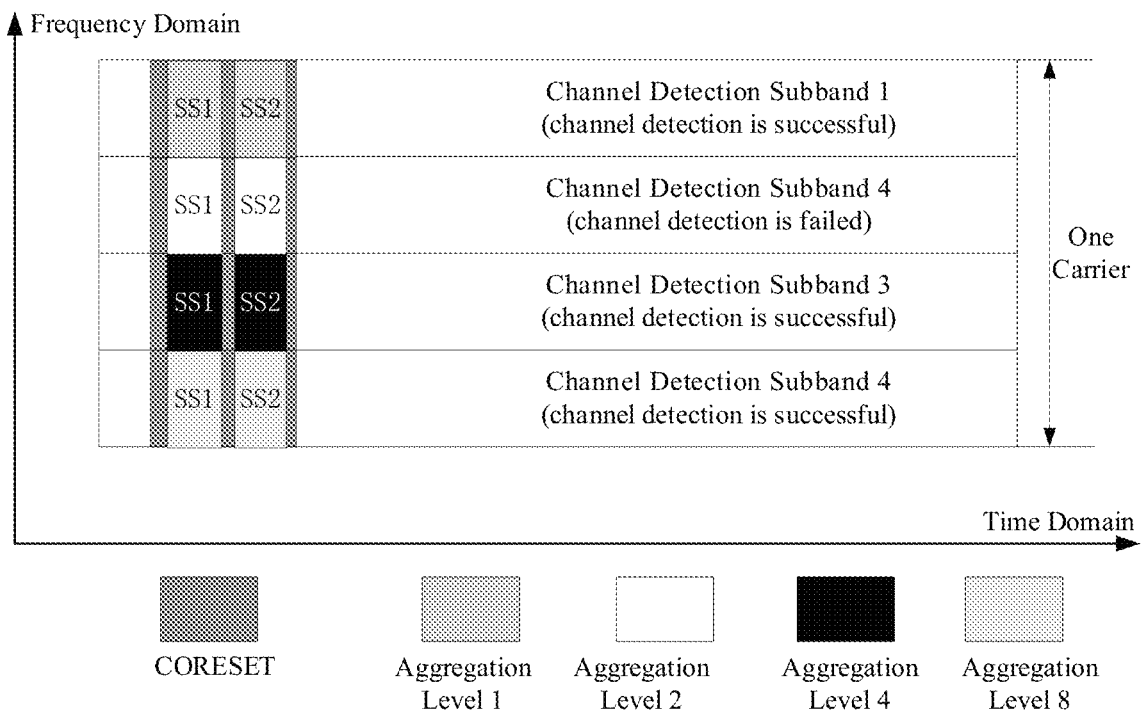

FIG. 6A

Receive control region configuration information from a base station, where the control region configuration information is generated by the base station for one or more channel detection subbands for configuring the control region — 710

Perform a corresponding control signaling detection based on the control region configuration information — 720

FIG. 7

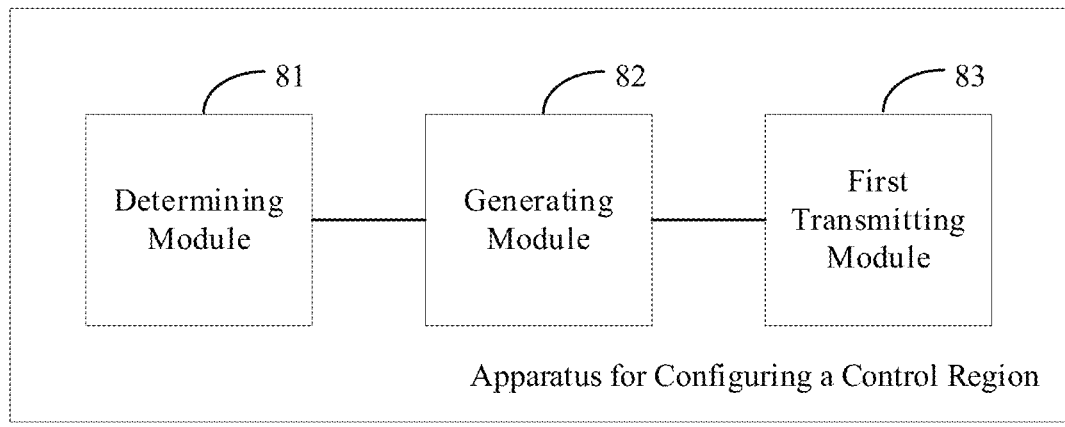

Apparatus for Configuring a Control Region

FIG. 8

METHODS AND APPARATUSES FOR CONFIGURING A CONTROL REGION

CROSS-REFERENCE TO RELATED APPLICATIONS

The present application is a national stage of International Application No. PCT/CN2019/079919 filed on Mar. 27, 2019, the disclosure of which is hereby incorporated by reference in its entirety.

TECHNICAL FIELD

The present disclosure relates to the field of communication technology, and in particular, relates to a method and an apparatus for configuring a control region.

BACKGROUND

A communication system of new generation is expected to support a flexible configuration of multiple types of services corresponding to different service requirements. For example, enhanced Mobile Broad Band (eMBB), as a type of service, mainly focuses on the requirements of wide bandwidth, high-speed rate, etc.; Ultra Reliable Low Latency Communication (URLLC), as another type of service, mainly focuses on the requirements of high reliability and low latency; and massive Machine Type Communication (mMTC), as another type of service, mainly focuses on the requirements of a large number of connections. However, with the service requirements developing, just utilizing a licensed spectrum may not be enough to satisfy the increasing service requirements in the communication system of new generation.

SUMMARY

In view of the above, examples of the present disclosure provide a method and an apparatus for configuring a control region.

According to a first aspect of the examples of the present disclosure, there is provided a method of configuring a control region, performed by a base station working on an unlicensed spectrum, and the method includes:
  determining one or more channel detection subbands for configuring the control region;
  generating control region configuration information corresponding to the one or more channel detection subbands; and
  transmitting the control region configuration information to a terminal to perform a corresponding control signaling detection based on the control region configuration information.

Alternatively or additionally, generating the control region configuration information corresponding to the one or more channel detection subbands includes:
  performing a channel detection for the one or more channel detection subbands to obtain a first channel detection result; and
  adding the first channel detection result into the control region configuration information.

Alternatively or additionally, the method further includes:
  acquiring a correspondence between pre-defined channel detection results for the one or more channel detection subbands and pre-defined control resource set (CORE-SET) configurations, where the channel detection result includes that the channel detection is successful or failed; and
  transmitting the correspondence to the terminal to determine a first CORESET configuration corresponding to the first channel detection result based on the correspondence.

Alternatively or additionally, generating the control region configuration information corresponding to the one or more channel detection subbands includes:
  acquiring a correspondence between pre-defined channel detection results for the one or more channel detection subbands and pre-defined CORESET configurations, where the channel detection result includes that a channel detection is successful or failed; and
  adding the correspondence into the control region configuration information.

Alternatively or additionally, generating the control region configuration information corresponding to the one or more channel detection subbands includes:
  configuring one or more search spaces corresponding to the one or more channel detection subbands, where each of the one or more search spaces is limited on one of the one or more channel detection subbands, and different search spaces correspond to different channel detection subbands;
  generating first indication information for representing the one or more search spaces; and
  adding the first indication information into the control region configuration information.

Alternatively or additionally, the method further includes:
  configuring a designated CORESET for the terminal, where the designated CORESET is to be mapped on the more channel detection subbands; and
  transmitting the designated CORESET to the terminal through high layer signaling.

Alternatively or additionally, generating the control region configuration information corresponding to the one or more channel detection subbands includes:
  configuring one or more sets of physical downlink control channel (PDCCH) candidates corresponding to the one or more channel detection subbands, where each set of PDCCH candidates, in which characteristics are identical, is limited on one of the one or more channel detection subbands, and the sets of PDCCH candidates, between which the characteristics are different, correspond to different channel detection subbands;
  generating second indication information for representing the one or more sets of PDCCH candidates; and
  adding the second indication information into the control region configuration information.

Alternatively or additionally, the method further includes:
  configuring a designated CORESET and a designated search space for the terminal, where the designated CORESET is to be mapped on the more channel detection subbands, and the designated search space covers the one or more sets of PDCCH candidates with the various characteristics; and
  transmitting the designated CORESET and the designated search space to the terminal through high layer signaling.

According to a second aspect of the examples of the present disclosure, there is provided a method of configuring a control region, performed by a terminal working on an unlicensed spectrum, and the method includes:
  receiving control region configuration information from a base station, where the control region configuration information is generated by the base station for one or more channel detection subbands for configuring the control region; and performing a corresponding control signaling detection based on the control region configuration information.

Alternatively or additionally, the control region configuration information includes a first channel detection result obtained from a channel detection performed by the base station for the one or more channel detection subbands;

where performing the control signaling detection based on the control region configuration information includes:

performing the control signaling detection based on the first channel detection result.

Alternatively or additionally, performing the control signaling detection based on the first channel detection result includes:

receiving, from the base station, a correspondence between pre-defined channel detection results for the one or more channel detection subbands and pre-defined CORESET configurations, where the channel detection result includes that the channel detection is successful or failed;

determining a first CORESET configuration corresponding to the first channel detection result based on the correspondence; and performing the control signaling detection based on the first CORESET configuration.

Alternatively or additionally, the control region configuration information includes: a correspondence between pre-defined channel detection results for the one or more channel detection subbands and pre-defined CORESET configurations, where the channel detection result includes that a channel detection is successful or failed;

where performing the control signaling detection based on the control region configuration information includes:

performing the channel detection for the one or more channel detection subbands to obtain a second channel detection result;

determining a second CORESET configuration corresponding to the second channel detection result based on the correspondence; and performing the control signaling detection based on the second CORESET configuration.

Alternatively or additionally, the control region configuration information includes first indication information about one or more search spaces configured by the base station for the one or more channel detection subbands, where each of the one or more search spaces is limited on one of the one or more channel detection subbands, and different search spaces correspond to different channel detection subbands;

where performing the control signaling detection based on the control region configuration information includes:

performing the control signaling detection in the one or more search spaces corresponding to the one or more channel detection subbands.

Alternatively or additionally, performing the control signaling detection in the one or more search spaces corresponding to the one or more channel detection subbands includes:

acquiring a designated CORESET pre-configured by the base station for the terminal, where the designated CORESET is to be mapped on the more channel detection subbands;

determining, among the one or more channel detection subbands on which the designated CORESET is mapped, a channel detection result that a channel detection for a first channel detection subband is successful;

determining the search space corresponding to the first channel detection subband based on the control region configuration information; and performing the control signaling detection in the search space corresponding to the first channel detection subband.

Alternatively or additionally, the control region configuration information includes second indication information about one or more sets of PDCCH candidates configured by the base station for the one or more channel detection subbands, where each set of PDCCH candidates, in which characteristics are identical, is limited on one of the one or more channel detection subbands, and the sets of PDCCH candidates, between which the characteristics are different, correspond to different channel detection subbands;

where performing the control signaling detection based on the control region configuration information includes:

detecting the set of PDCCH candidates with a corresponding characteristic on the one or more channel detection subbands.

Alternatively or additionally, detecting the set of PDCCH candidates with the corresponding characteristic on the one or more channel detection subbands includes:

acquiring a designated CORESET and a designated search space that are pre-configured by the base station for the terminal, where the designated CORESET is to be mapped on the more channel detection subbands, and the designated search space covers the one or more sets of PDCCH candidates with the various characteristics;

determining, among the one or more channel detection subbands on which the designated CORESET is mapped, a channel detection result that a channel detection for a second channel detection subband is successful;

determining the characteristic of the set of PDCCH candidates corresponding to the second channel detection subband based on the control region configuration information; and detecting, in a part of the designated search space that is on the second channel detection subband, the set of PDCCH candidates with the characteristic corresponding to the second channel detection subband.

According to a third aspect of the examples of the present disclosure, there is provided an apparatus for configuring a control region, configured in a base station working on an unlicensed spectrum, and the apparatus includes:

a determining module, configured to determine one or more channel detection subbands for configuring the control region;

a generating module, configured to generate control region configuration information corresponding to the one or more channel detection subbands; and a first transmitting module, configured to transmit the control region configuration information to a terminal to perform a corresponding control signaling detection based on the control region configuration information.

Alternatively or additionally, the generating module includes:

a channel detecting submodule, configured to perform a channel detection for the one or more channel detection subbands to obtain a first channel detection result; and a first adding submodule, configured to add the first channel detection result into the control region configuration information.

Alternatively or additionally, the apparatus further includes:

a first acquiring module, configured to acquire a correspondence between pre-defined channel detection results for the one or more channel detection subbands and pre-defined CORESET configurations, where the channel detection result includes that the channel detection is successful or failed; and a second transmitting module, configured to transmit the correspondence to the terminal to determine a first CORESET configuration corresponding to the first channel detection result based on the correspondence.

Alternatively or additionally, the generating module includes:

an acquiring submodule, configured to acquire a correspondence between pre-defined channel detection results for the one or more channel detection subbands and pre-defined CORESET configurations, where the channel detection result includes that a channel detection is successful or failed; and a second adding submodule, configured to add the correspondence into the control region configuration information.

Alternatively or additionally, the generating module includes:

a first configuring submodule, configured to configure one or more search spaces corresponding to the one or more channel detection subbands, where each of the one or more search spaces is limited on one of the one or more channel detection subbands, and different search spaces correspond to different channel detection subbands;

a first generating submodule, configured to generate first indication information for representing the one or more search spaces; and a third adding submodule, configured to add the first indication information into the control region configuration information.

Alternatively or additionally, the apparatus further includes:

a first configuring module, configured to configure a designated CORESET for the terminal, where the designated CORESET is to be mapped on the more channel detection subbands; and a third transmitting module, configured to transmit the designated CORESET to the terminal through high layer signaling.

Alternatively or additionally, the generating module includes:

a second configuring submodule, configured to configure one or more sets of PDCCH candidates corresponding to the one or more channel detection subbands, where each set of PDCCH candidates, in which aggregation levels are identical, is limited on one of the one or more channel detection subbands, and the sets of PDCCH candidates, between which aggregation levels are different, correspond to different channel detection subbands;

a second generating submodule, configured to generate second indication information for representing the one or more sets of PDCCH candidates; and a fourth adding submodule, configured to add the second indication information into the control region configuration information.

Alternatively or additionally, the apparatus further includes:

a second configuring module, configured to configure a designated CORESET and a designated search space for the terminal, where the designated CORESET is to be mapped on the more channel detection subbands, and the designated search space covers the one or more sets of PDCCH candidates with various aggregation levels; and a fourth transmitting module, configured to transmit the designated CORESET and the designated search space to the terminal through high layer signaling.

According to a fourth aspect of the examples of the present disclosure, there is provided an apparatus for configuring a control region, configured in a terminal working on an unlicensed spectrum, and the apparatus includes:

a receiving module, configured to receive control region configuration information from a base station, where the control region configuration information is generated by the base station for one or more channel detection subbands for configuring the control region; and a detecting module, configured to perform a corresponding control signaling detection based on the control region configuration information.

Alternatively or additionally, the control region configuration information includes a first channel detection result obtained from a channel detection performed by the base station for the one or more channel detection subbands;

where the detecting module includes:

a first detecting submodule, configured to perform the control signaling detection based on the first channel detection result.

Alternatively or additionally, the first detecting submodule includes:

a receiving unit, configured to receive, from the base station, a correspondence between pre-defined channel detection results for the one or more channel detection subbands and pre-defined CORESET configurations, where the channel detection result includes that the channel detection is successful or failed;

a first determining unit, configured to determine a first CORESET configuration corresponding to the first channel detection result based on the correspondence; and a first detecting unit, configured to perform the control signaling detection based on the first CORESET configuration.

Alternatively or additionally, the control region configuration information includes: a correspondence between pre-defined channel detection results for the one or more channel detection subbands and pre-defined CORESET configurations, where the channel detection result includes that a channel detection is successful or failed;

where the detecting module includes:

a second detecting submodule, configured to perform the channel detection for the one or more channel detection subbands to obtain a second channel detection result;

a first determining submodule, configured to determine a second CORESET configuration corresponding to the second channel detection result based on the correspondence; and a third detecting submodule, configured to perform the control signaling detection based on the second CORESET configuration.

Alternatively or additionally, the control region configuration information includes first indication information about one or more search spaces configured by the base station for the one or more channel detection subbands, where each of the one or more search spaces is limited on one of the one or more channel detection subbands, and different search spaces correspond to different channel detection subbands;

where the detecting module includes:
a fourth detecting submodule, configured to perform the control signaling detection in the one or more search spaces corresponding to the one or more channel detection subbands.

Alternatively or additionally, the fourth detecting submodule includes:
a first acquiring unit, configured to acquire a designated CORESET pre-configured by the base station for the terminal, where the designated CORESET is to be mapped on the more channel detection subbands;
a second determining unit, configured to determine, among the one or more channel detection subbands on which the designated CORESET is mapped, a channel detection result that a channel detection for a first channel detection subband is successful;
a third determining unit, configured to determine the search space corresponding to the first channel detection subband based on the control region configuration information; and
a second detecting unit, configured to perform the control signaling detection in the search space corresponding to the first channel detection subband.

Alternatively or additionally, the control region configuration information includes second indication information about one or more sets of PDCCH candidates configured by the base station for the one or more channel detection subbands, where each set of PDCCH candidates, in which characteristics are identical, is limited on one of the one or more channel detection subbands, and the sets of PDCCH candidates, between which the characteristics are different, correspond to different channel detection subbands;

where the detecting module includes:
a fifth detecting submodule, configured to detect the set of PDCCH candidates with a corresponding characteristic on the one or more channel detection subbands.

Alternatively or additionally, the fifth detecting submodule includes:
a second acquiring unit, configured to acquire a designated CORESET and a designated search space that are pre-configured by the base station for the terminal, where the designated CORESET is to be mapped on the more channel detection subbands, and the designated search space covers the one or more sets of PDCCH candidates with the various characteristics;
a fourth determining unit, configured to determine, among the one or more channel detection subbands on which the designated CORESET is mapped, a channel detection result that a channel detection for a second channel detection subband is successful;
a fifth determining unit, configured to determine the characteristic of the set of PDCCH candidates corresponding to the second channel detection subband based on the control region configuration information; and
a third detecting unit, configured to detect, in a part of the designated search space that is on the second channel detection subband, the set of PDCCH candidates with the characteristic corresponding to the second channel detection subband.

According to a fifth aspect of the examples of the present disclosure, there is provided a non-transitory computer-readable storage medium having a computer program stored thereon, where the computer program is configured to perform the methods of configuring a control region described in the first aspect.

According to a sixth aspect of the examples of the present disclosure, there is provided a non-transitory computer-readable storage medium having a computer program stored thereon, where the computer program is configured to perform the methods of configuring a control region described in the second aspect.

According to a seventh aspect of the examples of the present disclosure, there is provided an apparatus for configuring a control region, configured in a base station working on an unlicensed spectrum, and the apparatus includes:
one or more processors; and
a memory for storing instructions executable by the one or more processors;
where the one or more processors are configured to:
determine one or more channel detection subbands for configuring the control region;
generate control region configuration information corresponding to the one or more channel detection subbands; and
transmit the control region configuration information to a terminal to perform a corresponding control signaling detection based on the control region configuration information.

According to an eighth aspect of the examples of the present disclosure, there is provided an apparatus for configuring a control region, configured in a terminal working on an unlicensed spectrum, and the apparatus includes:
one or more processors; and
a memory for storing instructions executable by the one or more processors;
where the one or more processors are configured to:
receive control region configuration information from a base station, where the control region configuration information is generated by the base station for one or more channel detection subbands for configuring the control region; and
perform a corresponding control signaling detection based on the control region configuration information.

The technical solutions provided according to the examples of the present disclosure may obtain the following beneficial effects.

After determining one or more channel detection subbands for configuring a control region, a base station in the present disclosure can generate control region configuration information corresponding to the one or more channel detection subbands, and transmit the control region configuration information to a terminal, so that the terminal can perform a corresponding control signaling detection based on the control region configuration information, thereby ensuring that a PDCCH is transmitted without crossing different channel detection subbands, and also improving a transmission reliability of control signaling.

After receiving control region configuration information from a base station, where the control region configuration information is generated by the base station for one or more channel detection subbands for configuring a control region, a terminal in the present disclosure can perform a corresponding control signaling detection based on the control region configuration information, thereby ensuring that a PDCCH is transmitted without crossing different channel detection subbands, and also improving a transmission reliability of control signaling.

It should be understood that the above general description and the following detailed description are only exemplary and explanatory, and are not intended to limit the present disclosure.

BRIEF DESCRIPTION OF THE DRAWINGS

The accompanying drawings, which are incorporated in and constitute a part of this disclosure, illustrate examples consistent with the present disclosure and, together with the description, serve to explain the principles of the disclosure.

FIG. 3A is a schematic diagram of a correspondence between pre-defined channel detection results for one or more channel detection subbands and pre-defined CORE-SET configurations illustrated according to an example.

FIG. 5A is a schematic diagram of a control region configuration illustrated according to an example.

FIG. 6 is a flowchart of another method of configuring a control region illustrated according to an example.

FIG. 6A is a schematic diagram of another control region configuration illustrated according to an example.

FIG. 7 is a flowchart of a method of configuring a control region illustrated according to an example.

FIG. 8 is a block diagram of an apparatus for configuring a control region illustrated according to an example.

DETAILED DESCRIPTION

Figure 1:
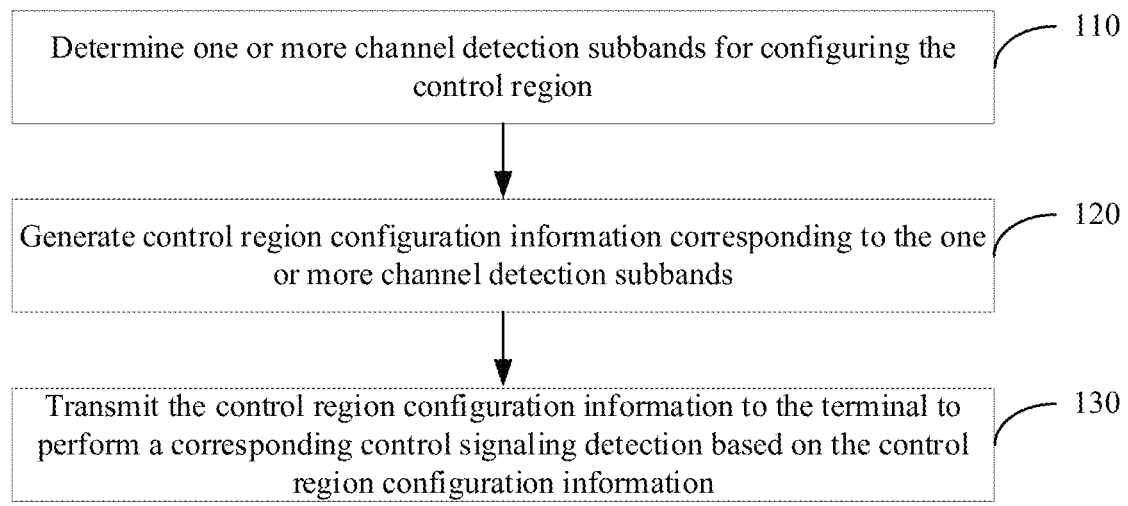
FIG. 1 is a flowchart of a method of configuring a control region illustrated according to an example.

Exemplary embodiments will be described in detail here with the examples thereof illustrated in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when", "upon", or "in response to determining".

Figure 2:
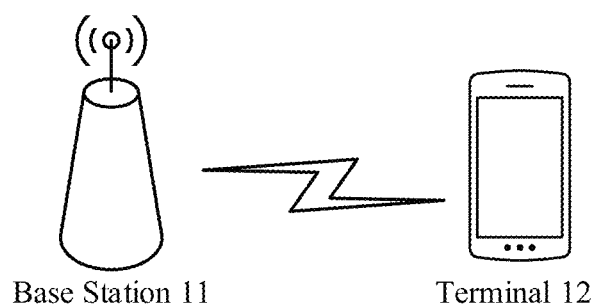
FIG. 2 is a scenario diagram of a method of configuring a control region illustrated according to an example.

FIG. 1 is a flowchart of a method of configuring a control region illustrated according to an example, and FIG. 2 is a scenario diagram of the method of configuring a control region illustrated according to an example. The method of configuring a control region can be performed by a base station working on an unlicensed spectrum. As illustrated in FIG. 1, the method of configuring a control region includes the following steps 110-130.

At step 110, one or more channel detection subbands for configuring the control region are determined.

In one or more examples of the present disclosure, the one or more channel detection subbands for configuring the control region may be a plurality of bandwidth parts configured on one unlicensed carrier, a plurality of unlicensed carriers, or a plurality of bandwidth parts configured on a plurality of unlicensed carriers.

At step 120, control region configuration information corresponding to the one or more channel detection subbands is generated.

In one or more examples of the present disclosure, the control region configuration information is configured to instruct a terminal about a resource position to be detected when performing a control signaling detection and/or about a detection scheme to be used when performing a control signaling detection.

In an example, the control region configuration information in the step 120 may include a first channel detection result obtained after the base station performs a channel detection on the one or more channel detection subbands. The detailed implementation of this example may refer to an example illustrated in FIG. 3.

In an example, the control region configuration information in the step 120 may include a correspondence, acquired by the base station, between pre-defined channel detection results for the one or more channel detection subbands and pre-defined CORESET configurations. The channel detection result includes that the channel detection is successful or failed. The detailed implementation of this example may refer to an example illustrated in FIG. 4.

In an example, the control region configuration information in the step 120 may include first indication information for representing one or more search spaces, configured by the base station, corresponding to the one or more channel detection subbands. Each of the one or more search spaces is limited to one of the one or more channel detection subbands, and different search spaces correspond to different channel detection subbands. The detailed implementation of this example may refer to an example illustrated in FIG. 5.

In an example, the control region configuration information in the step 120 may include second indication information for representing one or more sets of PDCCH candidates, configured by the base station, corresponding to the one or more channel detection subbands. Each set of PDCCH candidates, in which characteristics are identical, is limited on one of the one or more channel detection subbands, and the sets of PDCCH candidates, between which the characteristics are different, correspond to different channel detection subbands. The detailed implementation of this example may refer to an example illustrated in FIG. 6.

At step 130, the control region configuration information is transmitted to the terminal, so that the terminal performs a corresponding control signaling detection based on the control region configuration information.

As illustrated in FIG. 2, a base station 11 and a terminal 12 are included in an exemplary scenario. Through determining one or more channel detection subbands for configuring a control region, the base station 11 can generate control region configuration information corresponding to the one or more channel detection subbands and transmit the control region configuration information to the terminal. Thus, the terminal can perform a corresponding control signaling detection based on the control region configuration information.

In the present disclosure, the base station 11 may be a facility deployed in an access network to provide the terminal 12 with wireless communication functions. The base station 11 may cover various forms of a macro base station, a micro base station, a relay station, an access point and the like. In systems implemented in different wireless access technologies, the facility with base station functions may be named differently. For example, in a 5G NR system, it is called gNodeB or gNB. The name, "base station", may be changed with the development of communication technologies. In order to simplify the description, in the examples of the present disclosure, the above-mentioned facilities that provide the terminal 12 with the wireless communication functions is collectively referred to as base stations.

There are usually a plurality of terminals 12. In a cell controlled by one base station 11, there may distribute one or more terminals 12. The terminal 12 may cover various devices with the wireless communication functions, such as handheld devices, in-vehicle devices, wearable devices, computing devices or other processing devices connected to a wireless modem, and may cover various forms of User Equipment (UE), a mobile station (MS), a terminal device, etc. In order to simplify the description, in the examples of the present disclosure, the devices mentioned above are collectively referred to as terminals.

According to the above examples, after determining the one or more channel detection subbands for configuring the control region, the control region configuration information corresponding to the one or more channel detection subbands can be generated and transmitted to the terminal, so that the terminal can perform the corresponding control signaling detection based on the control region configuration information, thereby ensuring that a PDCCH is transmitted without crossing different channel detection subbands, and also improving a transmission reliability of control signaling.

Figure 3:
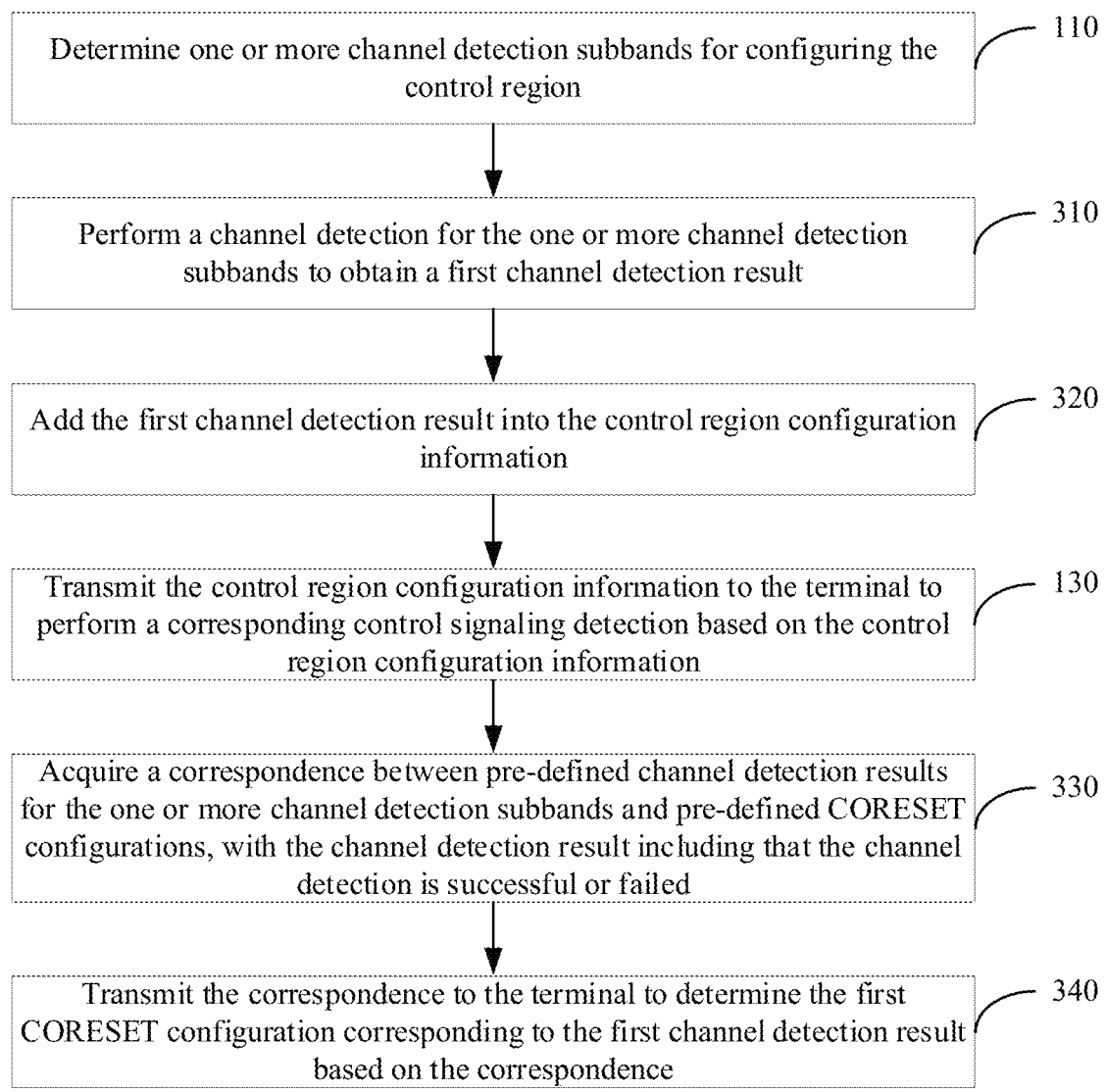
FIG. 3 is a flowchart of another method of configuring a control region illustrated according to an example.

FIG. 3 is a flowchart of another method of configuring a control region illustrated according to an example. The method of configuring a control region can be performed by a base station working on an unlicensed spectrum. As illustrated in FIG. 3, on the basis of the method illustrated in FIG. 1, when the step 120 is performed, the following steps 310-320 may be included.

At step 310, a channel detection is performed for the one or more channel detection subbands to obtain a first channel detection result.

In one or more examples of the present disclosure, the base station may utilize the first channel detection result to instruct the terminal about the detection scheme to be used when performing the control signaling detection. That is, different channel detection results have corresponding CORESET configurations respectively. The terminal may determine a corresponding first CORESET configuration based on the first channel detection result detected by the base station, and perform the corresponding control signaling detection based on the first CORESET configuration.

As an example, through the channel detection for channel detection subbands 1, 2 and 3 by the base station, the first channel detection result obtained specifically includes: the channel detection is successful for the subbands 1 and 2 and failed for the channel detection subband 3.

As another example, through the channel detection for channel detection subbands 1, 2 and 3 by the base station, the first channel detection result obtained specifically includes: the channel detection is successful for the channel detection subbands 1, 2 and 3.

At step 320, the first channel detection result is added into the control region configuration information.

In an example, as illustrated in FIG. 3, the method of configuring a control region may further include the following steps.

At step 330, a correspondence between pre-defined channel detection results for the one or more channel detection subbands and pre-defined CORESET configurations is acquired. The channel detection result includes that the channel detection is successful or failed.

In one or more examples of the present disclosure, the pre-defined correspondence may be configured in advance by the base station according to actual conditions, or may be specified in a communication protocol. In addition, the correspondence covers the pre-defined channel detection results for the one or more channel detection subbands and the pre-defined CORESET configurations. A detailed correspondence may refer to FIG. 3A.

(1-1) The channel detection is successful for the channel detection subband 1 and failed for the channel detection subbands 2 and 3, and correspondingly, the CORESET configuration includes CORESET1 and CORESET2.

(1-2) The channel detection is successful for the channel detection subband 2 and failed for the channel detection subbands 1 and 3, and correspondingly, the CORESET configuration includes CORESET1, CORESET2 and CORESET3.

(1-3) The channel detection is successful for the channel detection subband 3 and failed for the channel detection subbands 1 and 2, and correspondingly, the CORESET configuration includes CORESET1.

(1-4) The channel detection is successful for the channel detection subbands 1 and 2 and failed for the channel detection subband 3, and correspondingly, the CORESET configuration includes CORESET1 and CORESET2.

(1-5) The channel detection is successful for the channel detection subbands 1 and 3 and failed for the channel detection subband 2, and correspondingly, the CORESET configuration includes CORESET1 and CORESET2.

(1-6) The channel detection is successful for the channel detection subbands 2 and 3 and failed for the channel detection subband 1, and correspondingly, the CORESET configuration includes CORESET1, CORESET2 and CORESET3.

(1-7) The channel detection is successful for the channel detection subbands 1, 2 and 3, and correspondingly, the CORESET configuration includes CORESET1, CORESET2 and CORESET3.

At step 340, the correspondence is transmitted to the terminal, so that the terminal determines the first CORESET configuration corresponding to the first channel detection result based on the correspondence.

According to the above examples, during generating the control region configuration information corresponding to the one or more channel detection subbands, the channel detection may be performed for the one or more channel detection subbands firstly to obtain the first channel detection result, and the first channel detection result may be added into the control region configuration information. Therefore, it is realized through the channel detection result to instruct the terminal about a resource position to be detected when performing the control signaling detection and/or about a detection scheme to be used when performing the control signaling detection, which improves an accuracy of configuring the control region.

Figure 4:
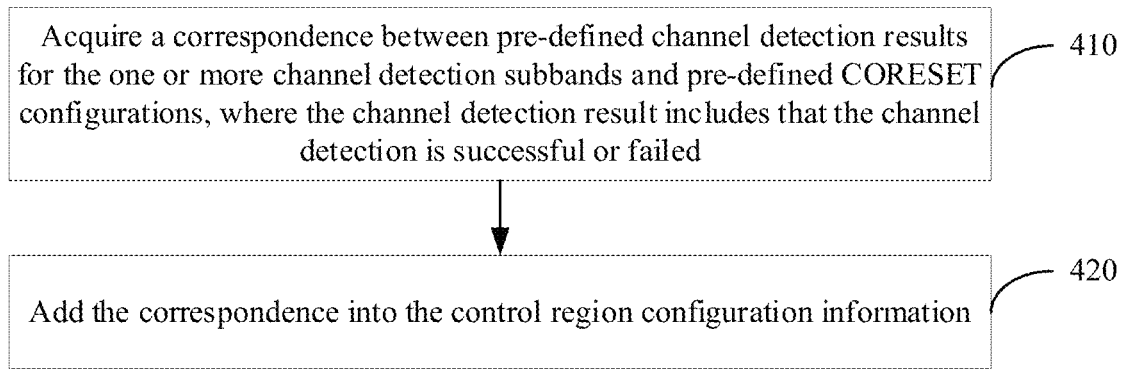
FIG. 4 is a flowchart of another method of configuring a control region illustrated according to an example.

FIG. 4 is a flowchart of another method of configuring a control region illustrated according to an example. The method of configuring a control region can be performed by a base station working on an unlicensed spectrum. As illustrated in FIG. 4, on the basis of the method illustrated in FIG. 1, when the step 120 is performed, steps 410-420 may be included.

At step 410, a correspondence between pre-defined channel detection results for the one or more channel detection subbands and pre-defined CORESET configurations is acquired. The channel detection result includes that the channel detection is successful or failed.

In one or more examples of the present disclosure, the pre-defined correspondence may be configured in advance by the base station according to actual conditions, or may be specified in a communication protocol. In addition, the correspondence covers the pre-defined channel detection results for the one or more channel detection subbands and the pre-defined CORESET configurations. A detailed correspondence may refer to FIG. 3A.

At step 420, the correspondence is added into the control region configuration information.

In one or more examples of the present disclosure, the base station only informs the terminal of the correspondence through the control region configuration information. Thereupon, after performing the channel detection for the one or more channel detection subbands and obtaining a second channel detection result, the terminal can determine a second CORESET configuration corresponding to the second channel detection result based on the correspondence, and perform the corresponding control signaling detection based on the second CORESET configuration.

According to the above examples, during generating the control region configuration information corresponding to the one or more channel detection subbands, the terminal may only be informed of the correspondence between the pre-defined channel detection results for the one or more channel detection subbands and the pre-defined CORESET configurations. Thus, after performing the channel detection for the one or more the channel detection subbands and obtaining the second channel detection result, the terminal may determine the second CORESET configuration corresponding to the second channel detection result based on the correspondence, and perform the corresponding control signaling detection based on the second CORESET configuration, thereby enriching the forms of configuring the control region and also improving an efficiency of configuring the control region.

Figure 5:
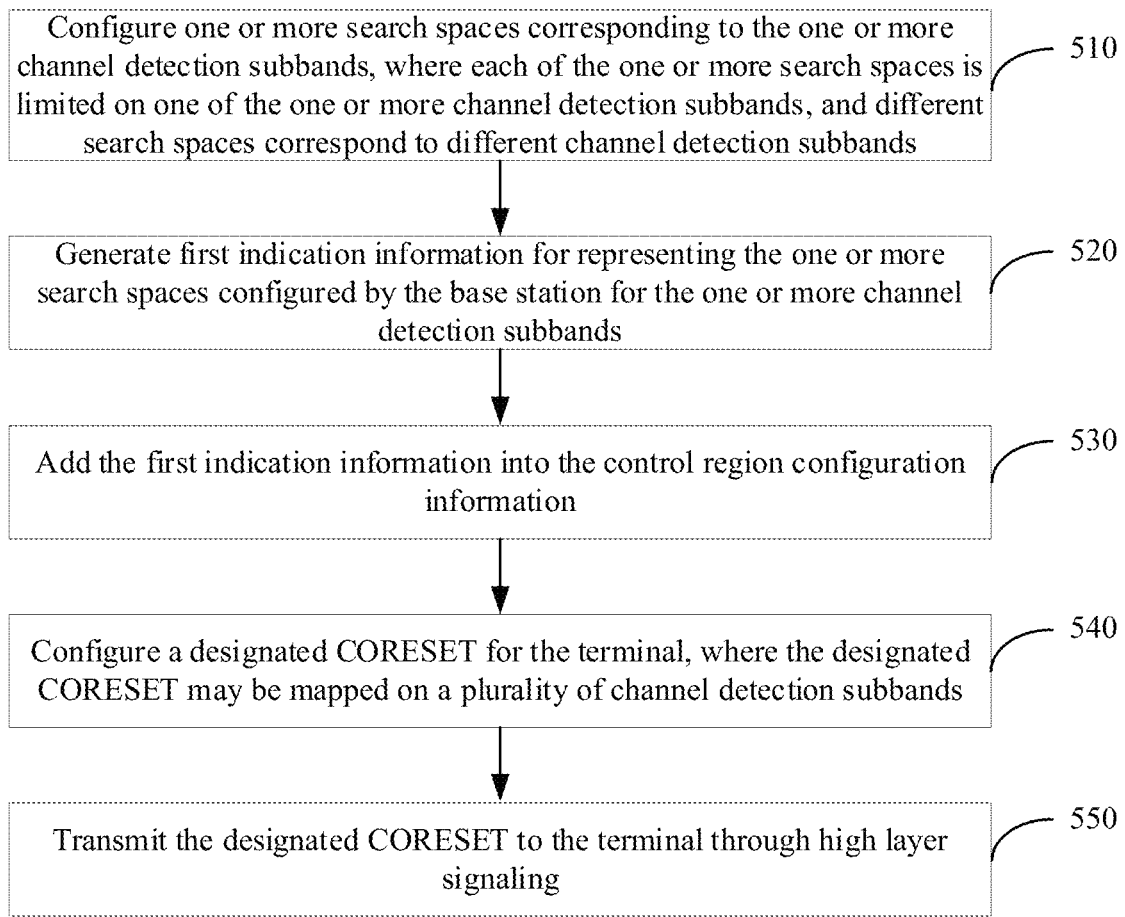
FIG. 5 is a flowchart of another method of configuring a control region illustrated according to an example.

FIG. 5 is a flowchart of another method of configuring a control region illustrated according to an example. The method of configuring a control region can be performed by a base station working on an unlicensed spectrum. As illustrated in FIG. 5, on the basis of the method illustrated in FIG. 1, when the step 120 is performed, the following steps 510-530 may be included.

At step 510, one or more search spaces corresponding to the one or more channel detection subbands are configured. Each of the one or more search spaces is limited on one of the one or more channel detection subbands, and different search spaces correspond to different channel detection subbands.

In one or more examples of the present disclosure, the base station may utilize the configured search spaces to instruct the terminal about a detection position to be used when performing the control signaling detection. In other words, when performing the control signaling detection, the detection position used by the terminal may be the one or more search spaces configured by the base station for the one or more channel detection subbands.

At step 520, first indication information is generated for representing the one or more search spaces configured by the base station for the one or more channel detection subbands.

At step 530, the first indication information is added into the control region configuration information.

In an example, in addition to configuring the one or more search spaces corresponding to the one or more channel detection subbands, the base station also configures a CORESET in advance. As illustrated in FIG. 5, the method of configuring a control region may further include the following steps.

At step 540, a designated CORESET is configured for the terminal. The designated CORESET may be mapped on a plurality of channel detection subbands.

At step 550, the designated CORESET is transmitted to the terminal through high layer signaling.

In one or more examples of the present disclosure, the high layer signaling for transmitting the designated CORESET may be radio resource control (RRC) signaling, media access control address control element (MAC CE), physical layer signaling, or the like.

In one or more examples of the present disclosure, there is no restriction on the execution order of the above step 510 and step 540. The step 510 and step 540 may be performed at the same time, the step 510 may be performed before the step 540, or the step 510 may be performed after the step 540.

In an exemplary scenario, as illustrated in FIG. 5A, the designated CORESET configured by the base station for the terminal is mapped on the channel detection subbands 2, 3, and 4, and the search spaces configured by the base station for the channel detection subbands 2, 3, and 4, i.e., SS1, SS2, and SS3 respectively, are limited to their respective channel detection subbands. Thus, based on the channel detection result, the terminal may determine in which search spaces corresponding to the channel detection subbands to perform the control signaling detection. For example, the channel detection result includes that the channel detection is successful for the channel detection subbands 3 and 4 and failed for the channel detection subband 2, and thus the terminal may perform the control signaling detection in the search spaces corresponding to the channel detection subbands 3 and 4, i.e., SS2 and SS3.

According to the above examples, during generating the corresponding control region configuration information corresponding to the one or more channel detection subbands, the one or more search spaces corresponding to the one or more channel detection subbands may be configured. Then, the terminal may be informed of the configured search spaces, which is convenient for the terminal to perform the control signaling detection in the one or more search spaces corresponding to the one or more channel detection subbands. Therefore, it is realized through the one or more search spaces to instruct the terminal about a detection position to be used when performing the control signaling detection, which improves a reliability of configuring the control region.

FIG. 6 is a flowchart of another method of configuring a control region illustrated according to an example. The method of configuring a control region can be performed by a base station working on an unlicensed spectrum. As illustrated in FIG. 6, on the basis of the method illustrated in FIG. 1, when the step 120 is performed, the following steps 610-630 may be included.

At step 610, one or more sets of PDCCH candidates corresponding to the one or more channel detection subbands are configured. Each set of PDCCH candidates, in which the characteristics are identical, is limited on one of the one or more channel detection subbands, and the sets of PDCCH candidates, between which the characteristics are different, correspond to different channel detection subbands.

In one or more examples of the present disclosure, the base station may utilize the characteristic of the configured sets of PDCCH candidates to instruct the terminal about a detectable content on various channel detection subbands. The characteristic of the one or more sets of PDCCH candidates may include an aggregation level, and/or a downlink control information (DCI) type to be detected, etc.

At step 620, second indication information is generated for representing the one or more sets of PDCCH candidates configured by the base station for the one or more channel detection subbands.

At step 630, the second indication information is added into the control region configuration information.

In an example, in addition to configuring the one or more sets of PDCCH candidates corresponding to the one or more channel detection subbands, the base station also configures a CORESET and a search space in advance. As illustrated in FIG. 6, the method of configuring a control region may further include the following steps.

At step 640, a designated CORESET and a designated search space are configured for the terminal. The designated CORESET may be mapped on a plurality of channel detection subbands, and the designated search space covers the one or more sets of PDCCH candidates with the various characteristics.

At step 650, the designated CORESET and the designated search space are transmitted to the terminal through high layer signaling.

In one or more examples of the present disclosure, the high layer signaling for transmitting the designated CORESET and the designated search space may be RRC signaling, MAC CE, physical layer signaling, or the like.

In one or more examples of the present disclosure, there is no restriction on the execution order of the above step 610 and step 640. The step 610 and step 640 may be performed at the same time, the step 610 may be performed before the step 640, or the step 610 may be performed after the step 610.

In an exemplary scenario, as illustrated in FIG. 6A, the designated CORESET configured by the base station for the terminal is mapped on the channel detection subbands 1, 2, 3, and 4. The sets of PDCCH candidates configured by the base station for the channel detection subbands 1, 2, 3, and 4 include specifically: the set of PDCCH candidates with aggregation level 1 is located in a part of the search space on the channel detection subband 1, the set of PDCCH candidates with aggregation level 2 is located in a part of the search space that is on the channel detection subband 2, the set of PDCCH candidates with aggregation level 4 is located in a part of the search space that is on the channel detection subband 3, and the set of PDCCH candidates with aggregation level 8 is located in a part of the search space that is on the channel detection subband 4. Thus, based on a channel detection result, the terminal may determine in which parts of the search space on the channel detection subbands to detect the sets of PDCCH candidates with corresponding characteristics. For example, the channel detection result include that the channel detection is successful for the channel detection subbands 1, 3, and 4 and failed for the channel detection subband 2. Thus, the terminal may detect the set of PDCCH candidates with aggregation level 1 in the part of the search spaces, i.e., SS1 and SS2, that is on the channel detection subband 1, detect the set of PDCCH candidates with aggregation level 4 in the part of the search spaces, i.e., SS1 and SS2, that is on the channel detection subband 3, and detect the set of PDCCH candidates with aggregation level 8 in the part of the search spaces, i.e., SS1 and SS2, that is on the channel detection subband 4.

According to the above examples, during generating the control region configuration information corresponding to the one or more channel detection subbands, the sets of PDCCH candidates corresponding to the one or more channel detection subbands may be configured. Then, the terminal may be informed of the configured sets of PDCCH candidates, which is convenient for the terminal to operate the corresponding sets of PDCCH candidates in one or more parts of the search space that are on the one or more channel detection subbands. Therefore, it is realized through the one or more sets of PDCCH candidates to instruct the terminal about the detectable contents on respective channel detection subbands, which improves a practicality of configuring the control region.

FIG. 7 is a flowchart of a method of configuring a control region illustrated according to an example. The method of configuring a control region may be performed by a terminal working on an unlicensed spectrum. As illustrated in FIG. 7, the method of configuring a control region includes the following steps 710-720.

At step 710, control region configuration information is received from a base station. The control region configuration information is generated by the base station for one or more channel detection subbands for configuring the control region.

In one or more examples of the present disclosure, through the control region configuration information, the base station may instruct the terminal about a resource position to be detected when performing a control signaling detection and/or about a detection scheme to be used when performing a control signaling detection.

In addition, the one or more channel detection subbands for configuring the control region may be a plurality of bandwidth parts configured on one unlicensed carrier, a plurality of unlicensed carriers, or a plurality of bandwidth parts configured on a plurality of unlicensed carriers. Moreover, the control region configuration information transmitted by the base station is configured to instruct the terminal about the detection scheme to be used when performing the control signaling detection.

At step 720, a corresponding control signaling detection is performed based on the control region configuration information.

In one or more examples of the present disclosure, since the control region configuration information includes different contents, the terminal may adopt different detection schemes respectively to perform the control signaling detection.

In an example, the control region configuration information in the step 710 may include: a first channel detection result obtained from a channel detection performed by the base station for the one or more channel detection subbands. Correspondingly, when the step 720 is performed, it may include:

(2-1) performing the control signaling detection based on the first channel detection result.

In an example, when the step (2-1) is performed, it may include:

(3-1) receiving, from the base station, a correspondence between pre-defined channel detection results for the one or more channel detection subbands and pre-defined CORESET configurations, where the channel detection result includes that the channel detection is successful or failed;

(3-2) determining a first CORESET configuration corresponding to the first channel detection result based on the correspondence; and (3-3) performing the control signaling detection based on the first CORESET configuration.

In an example, the control region configuration information in the step 710 may include: a correspondence between pre-defined channel detection results for the one or more channel detection subbands and pre-defined CORESET configurations, where the channel detection result includes that the channel detection is successful or failed. Correspondingly, when the step 720 is performed, it may include:

(4-1) performing the channel detection for the one or more channel detection subbands to obtain a second channel detection result;

(4-2) determining a second CORESET configuration corresponding to the second channel detection result based on the correspondence; and (4-3) performing the control signaling detection based on the second CORESET configuration.

In the above examples, the pre-defined correspondence may be configured in advance by the base station according to actual conditions, or may be specified in a communication protocol. In addition, the correspondence covers the pre-defined channel detection results for the one or more channel detection subbands and the pre-defined CORESET configurations. A detailed correspondence may refer to FIG. 3A.

In an example, the control region configuration information in the step 710 may include: first indication information about one or more search spaces configured by the base station for the one or more channel detection subbands, where each of the one or more search spaces is limited on one of the one or more channel detection subbands, and different search spaces correspond to different channel detection subbands. Correspondingly, when the step 720 is performed, it may include:

(5-1) performing the control signaling detection in the one or more search spaces corresponding to the one or more channel detection subbands.

In one or more examples of the present disclosure, the base station may utilize the configured search spaces to instruct the terminal about a detection position to be used when performing the control signaling detection. In other words, the detection position to be used by the terminal when performing the control signaling detection may be the one or more search spaces configured by the base station for the one or more channel detection subbands.

In an example, when the step (5-1) is performed, it may include:

(6-1) acquiring a designated CORESET pre-configured by the base station for the terminal, where the designated CORESET is to be mapped on a plurality of channel detection subbands;

(6-2) determining, among the one or more channel detection subbands on which the designated CORESET is mapped, a channel detection result that a channel detection for a first channel detection subband is successful;

(6-3) determining the search space corresponding to the first channel detection subband based on the control region configuration information; and (6-4) performing the control signaling detection in the search space corresponding to the first channel detection subband.

The above-mentioned (6-1) to (6-4), of which an exemplary scenario is illustrated in FIG. 5A, will not be repeated here.

In an example, the control region configuration information in the step 710 may include: second indication information about one or more sets of PDCCH candidates configured by the base station for the one or more channel detection subbands, where each set of PDCCH candidates, in which characteristics are identical, is limited on one of the one or more channel detection subbands, and the sets of PDCCH candidates, between which the characteristics are different, correspond to different channel detection subbands. Correspondingly, when the step 720 is performed, it may include:

(7-1) detecting the set of PDCCH candidates with a corresponding characteristic on the one or more channel detection subbands.

In one or more examples of the present disclosure, the base station may utilize the characteristic of the configured sets of PDCCH candidates to instruct the terminal about a detectable content on various channel detection subbands. The characteristic of the one or more sets of PDCCH candidates may include an aggregation level, and/or a DCI type to be detected, etc.

In an example, when the step (7-1) is performed, it may include:

(8-1) acquiring a designated CORESET and a designated search space that are pre-configured by the base station for the terminal, where the designated CORESET is to be mapped on a plurality of channel detection subbands, and the designated search space covers the one or more sets of PDCCH candidates with the various characteristics;

(8-2) determining, among the one or more channel detection subbands on which the designated CORESET is mapped, a channel detection result that a channel detection for a second channel detection subband is successful;

(8-3) determining the characteristic of the set of PDCCH candidates corresponding to the second channel detection subband based on the control region configuration information; and (8-4) detecting, in a part of the designated search space that is on the second channel detection subband, the set of PDCCH candidates with the characteristic corresponding to the second channel detection subband.

The above-mentioned (8-1) to (8-4), of which an exemplary scenario is illustrated in FIG. 6A, will not be repeated here.

According to the above examples, after receiving the control region configuration information from the base station, where the control region configuration information is generated by the base station for the one or more channel detection subbands for configuring the control region, the corresponding control signaling detection can be performed based on the control region configuration information, thereby ensuring that a PDCCH is transmitted without crossing different channel detection subbands, and also improving a transmission reliability of control signaling. In particular, respective detection scheme may be adopted according to the different contents included in the control region configuration information, thereby enriching the forms of configuring the control region, and also improving a reliability and an accuracy of configuring the control region.

Corresponding to the foregoing method examples of configuring a control region, the present disclosure also provides apparatus examples for configuring a control region.

FIG. 8 is a block diagram of an apparatus for configuring a control region illustrated according to an example. The apparatus is configured in a base station working on an unlicensed spectrum and configured for performing the method of configuring a control region illustrated in FIG. 1. As illustrated in FIG. 8, the apparatus for configuring a control region may include:

a determining module 81 that is configured to determine one or more channel detection subbands for configuring the control region;

a generating module 82 that is configured to generate control region configuration information corresponding to the one or more channel detection subbands; and a first transmitting module 83 that is configured to transmit the control region configuration information to a terminal to perform a corresponding control signaling detection based on the control region configuration information.

According to the above example, after determining the one or more channel detection subbands for configuring the control region, the control region configuration information corresponding to the one or more channel detection subbands can be generated and transmitted to the terminal, so that the terminal can perform the corresponding control signaling detection based on the control region configuration information, thereby ensuring that a PDCCH is transmitted without crossing different channel detection subbands, and also improving a transmission reliability of control signaling.

Figure 9:
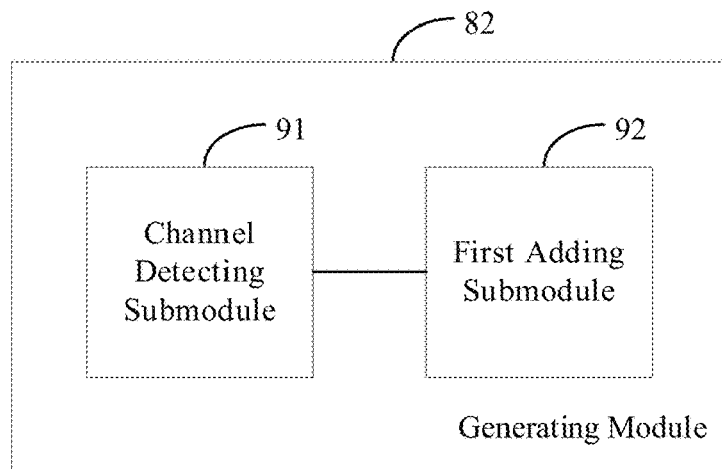
FIG. 9 is a block diagram illustrating another apparatus for configuring a control region illustrated according to an example.

In an example illustrated in FIG. 9, on the basis of the apparatus illustrated in FIG. 8, the generating module 82 may include:

a channel detecting submodule 91 that is configured to perform a channel detection for the one or more channel detection subbands to obtain a first channel detection result; and a first adding submodule 92 that is configured to add the first channel detection result into the control region configuration information.

Figure 10:
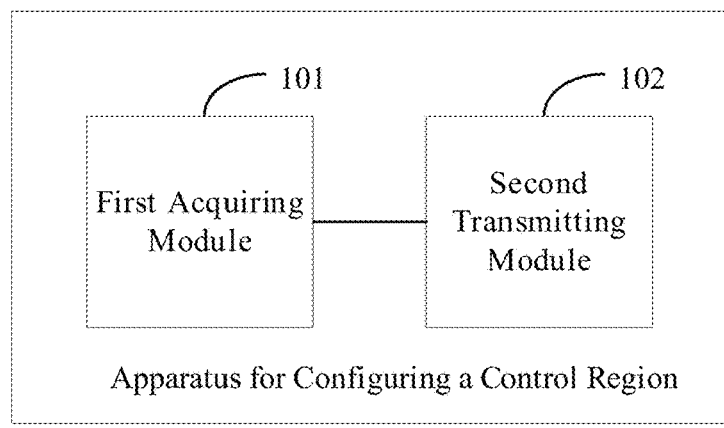
FIG. 10 is a block diagram illustrating another apparatus for configuring a control region illustrated according to an example.

In an example illustrated in FIG. 10, on the basis of the apparatus illustrated in FIG. 9, the apparatus may further include:

a first acquiring module 101 that is configured to acquire a correspondence between pre-defined channel detection results for the one or more channel detection subbands and pre-defined CORESET configurations, where the channel detection result includes that the channel detection is successful or failed; and a second transmitting module 102 that is configured to transmit the correspondence to the terminal, so that the terminal determines a first CORESET configuration corresponding to the first channel detection result based on the correspondence.

According to the above example, during generating the control region configuration information corresponding to the one or more channel detection subbands, the channel detection may be performed for the one or more channel detection subbands firstly to obtain the first channel detection result, and the first channel detection result may be added into the control region configuration information. Therefore, it is realized through the channel detection result to instruct the terminal about a resource position to be detected when performing the control signaling detection and/or a detection scheme to be used when performing the control signaling detection, which improves an accuracy of configuring the control region.

Figure 11:
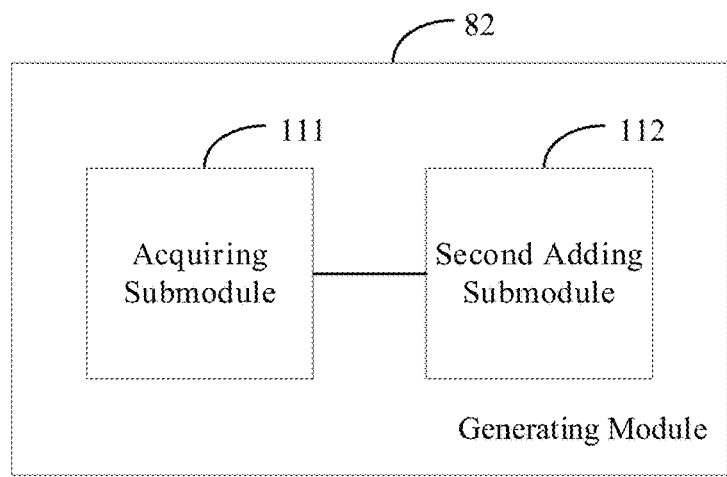
FIG. 11 is a block diagram illustrating another apparatus for configuring a control region illustrated according to an example.

In an example illustrated in FIG. 11, on the basis of the apparatus illustrated in FIG. 8, the generating module 82 may include:

an acquiring submodule 111 that is configured to acquire a correspondence between pre-defined channel detection results for the one or more channel detection subbands and pre-defined CORESET configurations, where the channel detection result includes that a channel detection is successful or failed; and a second adding submodule 112 that is configured to add the correspondence into the control region configuration information.

According to the above example, during generating the control region configuration information corresponding to the one or more channel detection subbands, the terminal may only be informed of the correspondence between the pre-defined channel detection results for the one or more channel detection subbands and the pre-defined CORESET configurations. Thus, after performing the channel detection for the one or more the channel detection subbands and obtaining the second channel detection result, the terminal may determine the second CORESET configuration corresponding to the second channel detection result based on the correspondence, and perform the corresponding control signaling detection based on the second CORESET configuration, thereby enriching the forms of configuring the control region and also improving an efficiency of configuring the control region.

Figure 12:
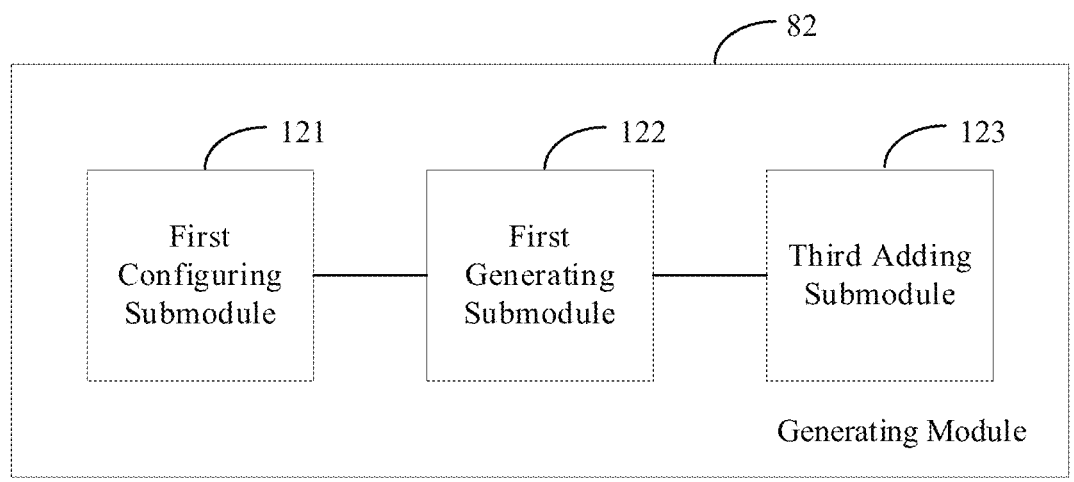
FIG. 12 is a block diagram illustrating another apparatus for configuring a control region illustrated according to an example.

In an example illustrated in FIG. 12, on the basis of the apparatus illustrated in FIG. 8, the generating module 82 may include:

a first configuring submodule 121 that is configured to configure one or more search spaces corresponding to the one or more channel detection subbands, where each of the one or more search spaces is limited on one of the one or more channel detection subbands, and different search spaces correspond to different channel detection subbands;

a first generating submodule 122 that is configured to generate first indication information for representing the one or more search spaces; and a third adding submodule 123 that is configured to add the first indication information into the control region configuration information.

Figure 13:
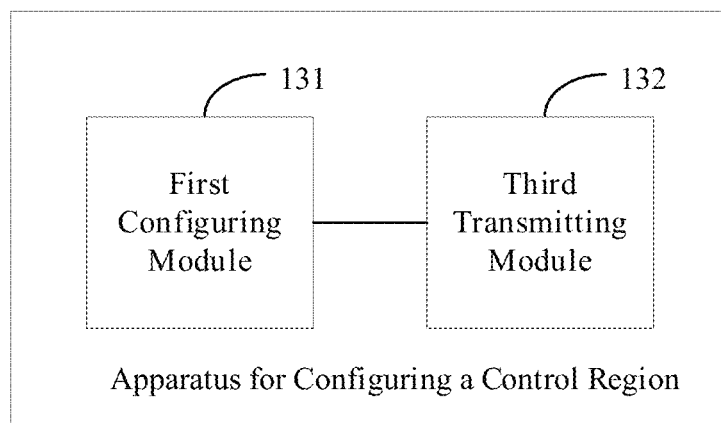
FIG. 13 is a block diagram illustrating another apparatus for configuring a control region illustrated according to an example.

In an example illustrated in FIG. 13, on the basis of the apparatus illustrated in FIG. 12, the apparatus may further include:

a first configuring module 131 that is configured to configure a designated CORESET for the terminal, where the designated CORESET is to be mapped on a plurality of channel detection subbands; and a third transmitting module 132 that is configured to transmit the designated CORESET to the terminal through high layer signaling.

According to the above example, during generating the control region configuration information corresponding to the one or more channel detection subbands, the one or more search spaces corresponding to the one or more channel detection subbands may be configured. Then, the terminal may be informed of the configured search spaces, which is convenient for the terminal to perform the control signaling detection in the one or more search spaces corresponding to the one or more channel detection subbands. Therefore, it is realized through the one or more search spaces to instruct the terminal about a detection position to be used when performing the control signaling detection, which improves a reliability of configuring the control region.

Figure 14:
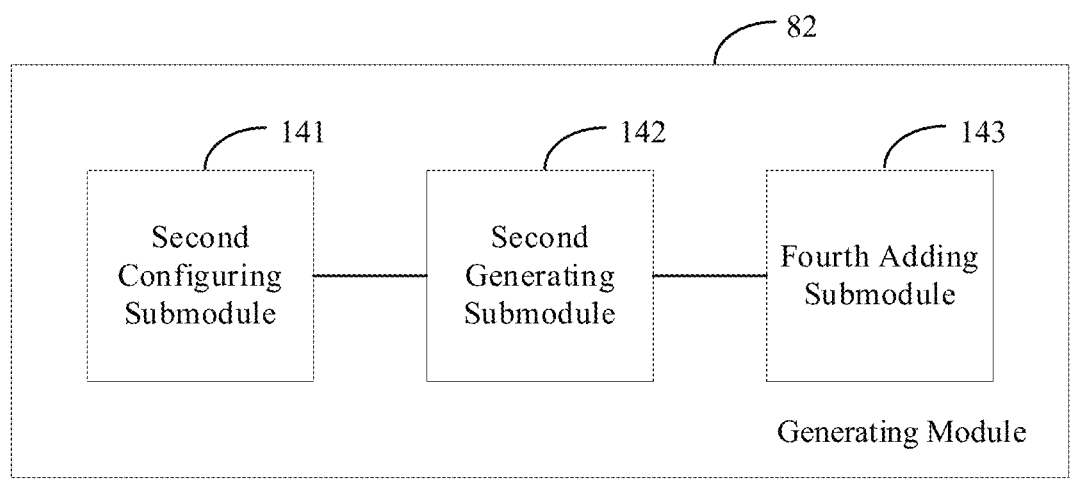
FIG. 14 is a block diagram illustrating another apparatus for configuring a control region illustrated according to an example.

In an example illustrated in FIG. 14, on the basis of the apparatus illustrated in FIG. 8, the generating module 82 may include:

a second configuring submodule 141 that is configured to configure one or more sets of PDCCH candidates corresponding to the one or more channel detection subbands, where each set of PDCCH candidates, in which aggregation levels are identical, is limited on one of the one or more channel detection subbands, and the sets of PDCCH candidates, between which the aggregation levels are different, correspond to different channel detection subbands;

a second generating submodule 142 that is configured to generate second indication information for representing the one or more sets of PDCCH candidates; and a fourth adding submodule 143 that is configured to add the second indication information into the control region configuration information.

Figure 15:
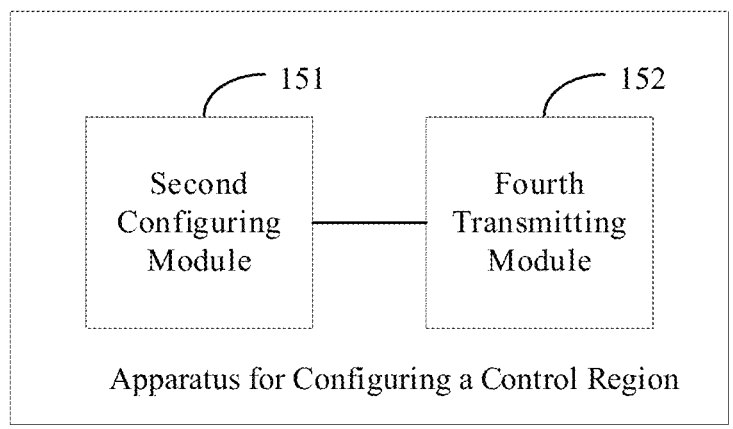
FIG. 15 is a block diagram illustrating another apparatus for configuring a control region illustrated according to an example.

In an example illustrated in FIG. 15, on the basis of the apparatus illustrated in FIG. 14, the apparatus may further include:

a second configuring module 151 that is configured to configure a designated CORESET and a designated search space for the terminal, where the designated CORESET is to be mapped on a plurality of channel detection subbands, and the designated search space covers the one or more sets of PDCCH candidates with the various aggregation levels; and a fourth transmitting module 152 that is configured to transmit the designated CORESET and the designated search space to the terminal through high layer signaling.

According to the above example, during generating the control region configuration information corresponding to the one or more channel detection subbands, the one or more sets of PDCCH candidates corresponding to the one or more channel detection subbands may be configured. Then, the terminal may be informed of the configured sets of PDCCH candidates, which is convenient for the terminal to operate the corresponding sets of PDCCH candidates in one or more parts of the search space that are on the one or more channel detection subbands. Therefore, it is realized through the one or more sets of PDCCH candidates to instruct the terminal about the detectable contents on respective channel detection subbands, which improves a practicality of configuring the control region.

Figure 16:
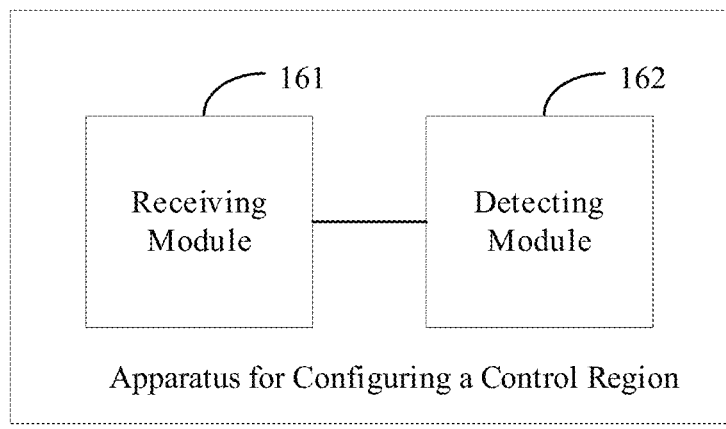
FIG. 16 is a block diagram of an apparatus for configuring a control region illustrated according to an example.

FIG. 16 is a block diagram of an apparatus for configuring a control region illustrated according to an example. The apparatus is configured in a terminal working on an unlicensed spectrum and configured for performing the method of configuring a control region illustrated in FIG. 7. As illustrated in FIG. 16, the apparatus for configuring a control region may include:

a receiving module 161 that is configured to receive control region configuration information from a base station, where the control region configuration information is generated by the base station for one or more channel detection subbands for configuring the control region; and a detecting module 162 that is configured to perform a corresponding control signaling detection based on the control region configuration information.

Figure 17:
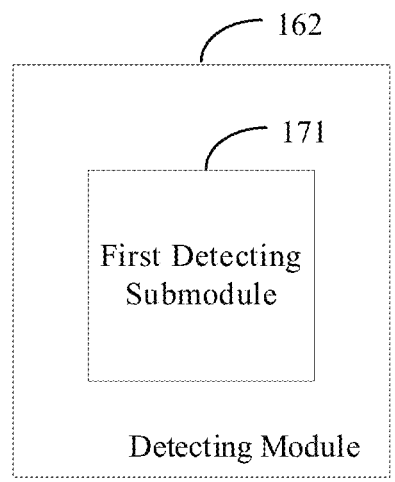
FIG. 17 is a block diagram illustrating another apparatus for configuring a control region illustrated according to an example.

In an example as illustrated in FIG. 17, on the basis of the apparatus illustrated in FIG. 16, the control region configuration information includes a first channel detection result obtained from a channel detection performed by the base station for the one or more channel detection channels. The detecting module 162 may include:

- a first detecting submodule 171 that is configured to perform the control signaling detection based on the first channel detection result.

Figure 18:
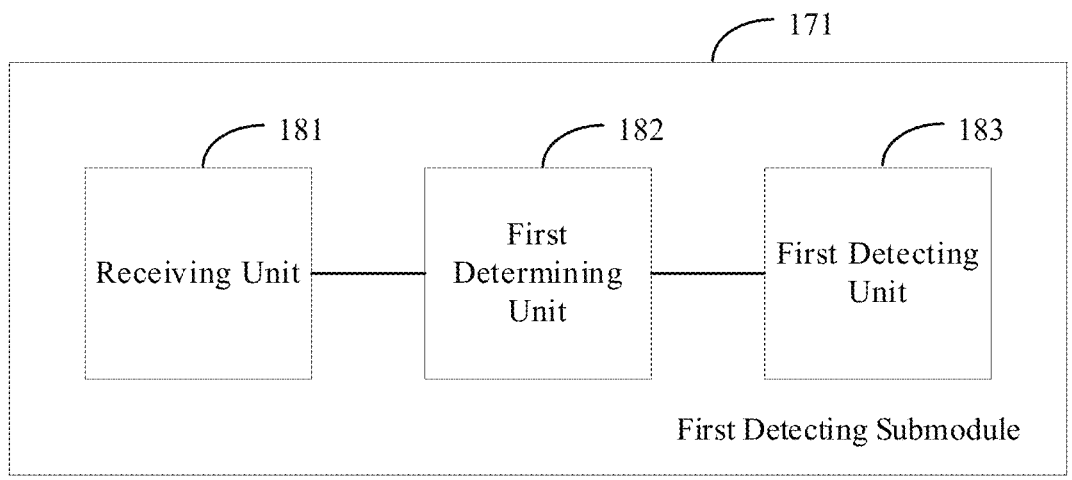
FIG. 18 is a block diagram illustrating another apparatus for configuring a control region illustrated according to an example.

In an example as illustrated in FIG. 18, on the basis of the apparatus illustrated in FIG. 17, the first detecting submodule 171 may include:

- a receiving unit 181 that is configured to receive, from the base station, a correspondence between pre-defined channel detection results for the one or more channel detection subbands and pre-defined CORESET configurations, where the channel detection result includes that the channel detection is successful or failed;
- a first determining unit 182 that is configured to determine a first CORESET configuration corresponding to the first channel detection result based on the correspondence; and
- a first detecting unit 183 that is configured to perform the control signaling detection based on the first CORESET configuration.

Figure 19:
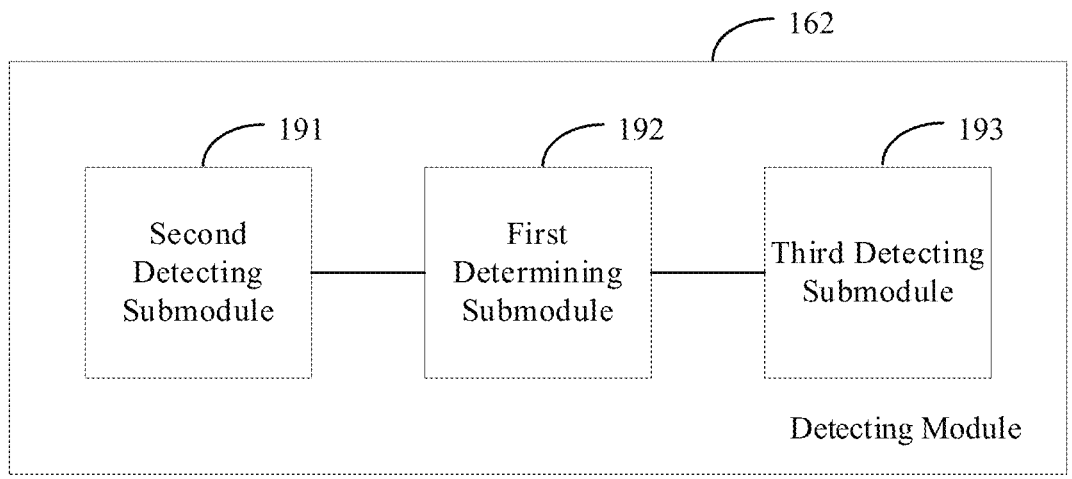
FIG. 19 is a block diagram illustrating another apparatus for configuring a control region illustrated according to an example.

In an example as illustrated in FIG. 19, on the basis of the apparatus illustrated in FIG. 16, the control region configuration information includes: a correspondence between pre-defined channel detection results for the one or more channel detection subbands and pre-defined CORESET configurations. The channel detection result includes that a channel detection is successful or failed. The detecting module 162 may include:

- a second detecting submodule 191 that is configured to perform the channel detection for the one or more channel detection subbands to obtain a second channel detection result;
- a first determining submodule 192 that is configured to determine a second CORESET configuration corresponding to the second channel detection result based on the correspondence; and
- a third detecting submodule 193 that is configured to perform the control signaling detection based on the second CORESET configuration.

Figure 20:
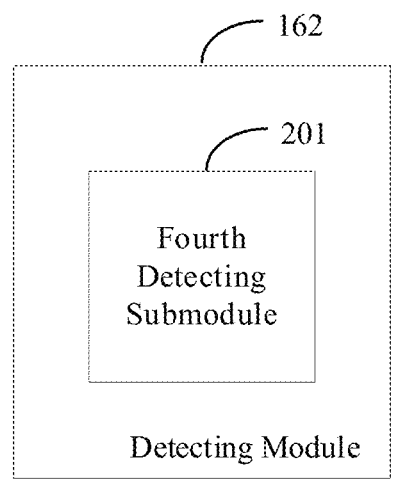
FIG. 20 is a block diagram illustrating another apparatus for configuring a control region illustrated according to an example.

In an example as illustrated in FIG. 20, on the basis of the apparatus illustrated in FIG. 16, the control region configuration information includes first indication information about one or more search spaces configured by the base station for the one or more channel detection subbands. Each of the one or more search spaces is limited on one of the one or more channel detection subbands, and different search spaces correspond to different channel detection subbands. The detecting module 162 may include:

- a fourth detecting submodule 201 that is configured to perform the control signaling detection in the one or more search spaces corresponding to the one or more channel detection subbands.

Figure 21:
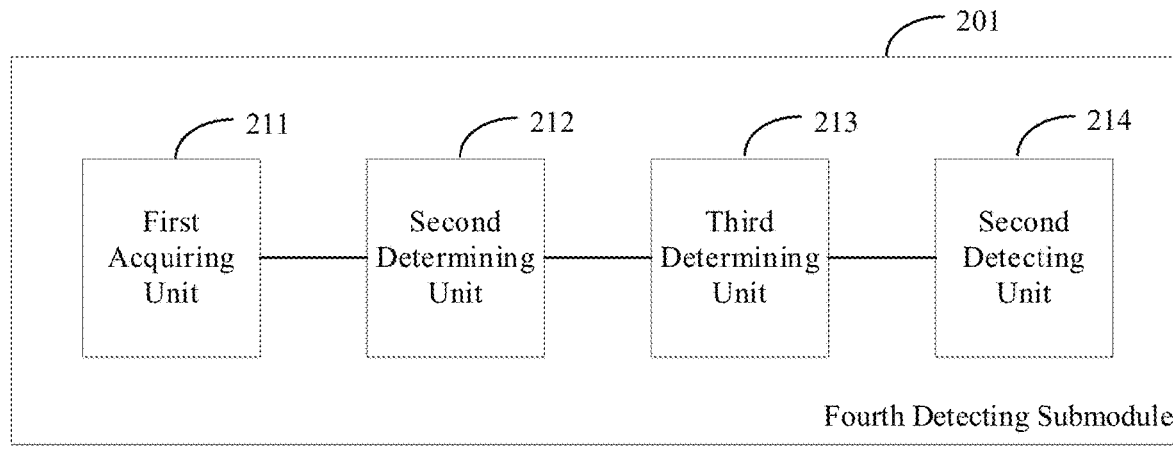
FIG. 21 is a block diagram illustrating another apparatus for configuring a control region illustrated according to an example.

In an example as illustrated in FIG. 21, on the basis of the apparatus illustrated in FIG. 20, the fourth detecting submodule 201 may include:

- a first acquiring unit 211 that is configured to acquire a designated CORESET pre-configured by the base station for the terminal, where the designated CORESET is to be mapped on a plurality of channel detection subbands;
- a second determining unit 212 that is configured to determine, among the one or more channel detection subbands on which the designated CORESET is mapped, a channel detection result that a channel detection for a first channel detection subband is successful;
- a third determining unit 213 that is configured to determine the search space corresponding to the first channel detection subband based on the control region configuration information; and
- a second detecting unit 214 that is configured to perform the control signaling detection in the search space corresponding to the first channel detection subband.

Figure 22:
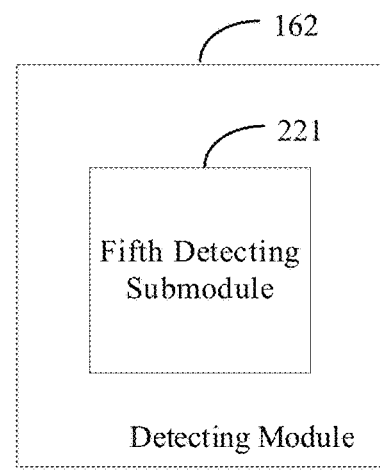
FIG. 22 is a block diagram illustrating another apparatus for configuring a control region illustrated according to an example.

In an example as illustrated in FIG. 22, on the basis of the apparatus illustrated in FIG. 16, the control region configuration information includes second indication information about one or more sets of PDCCH candidates configured by the base station for the one or more channel detection subbands. Each set of PDCCH candidates, in which characteristics are identical, is limited on one of the one or more channel detection subbands, and the sets of PDCCH candidates, between which the characteristics are different, correspond to different channel detection subbands. The detecting module 162 may include:

- a fifth detecting submodule 221 that is configured to detect the set of PDCCH candidates with a corresponding characteristic on the one or more channel detection subbands.

Figure 23:
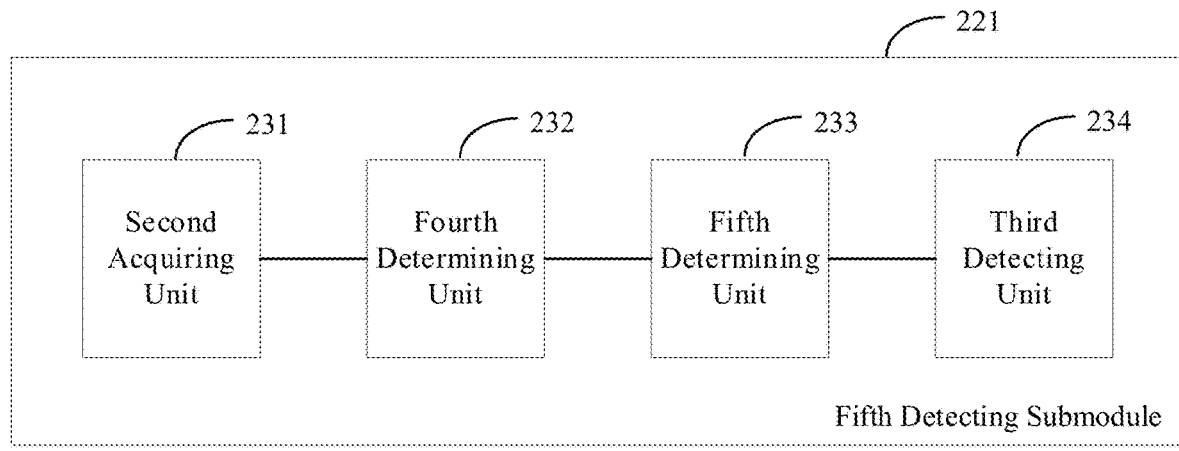
FIG. 23 is a block diagram illustrating another apparatus for configuring a control region illustrated according to an example.

In an example as illustrated in FIG. 23, on the basis of the apparatus illustrated in FIG. 22, the fifth detection submodule 221 may include:

- a second acquiring unit 231 that is configured to acquire a designated CORESET and a designated search space that are pre-configured by the base station for the terminal, where the designated CORESET is to be mapped on a plurality of channel detection subbands, and the designated search space covers the one or more sets of PDCCH candidates with the various characteristics;
- a fourth determining unit 232 that is configured to determine, among the one or more channel detection subbands on which the designated CORESET is mapped, a channel detection result that a channel detection for a second channel detection subband is successful;
- a fifth determining unit 233 that is configured to determine the characteristic of the set of PDCCH candidates corresponding to the second channel detection subband based on the control region configuration information; and
- a third detecting unit 234 that is configured to detect, in a part of the designated search space that is on the second channel detection subband, the set of PDCCH candidates with the characteristic corresponding to the second channel detection subband.

According to the above examples, after receiving the control region configuration information from the base station, where the control region configuration information is generated by the base station for the one or more channel detection subbands for configuring the control region, the corresponding control signaling detection can be performed based on the control region configuration information, thereby ensuring that a PDCCH is transmitted without crossing different channel detection subbands, and also improving a transmission reliability of control signaling. In particular, respective detection schemes may be adopted according to the different contents included in the control region configuration information, thereby enriching the forms of configuring the control region, and also improving a reliability and an accuracy of configuring the control region.

Since the apparatus examples essentially correspond to the method examples, reference may be made to the description of related parts of the method examples. The apparatus examples described above are merely illustrative, where the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

The present disclosure also provides a non-transitory computer-readable storage medium having a computer program stored thereon, and the computer program is configured to perform the method of configuring a control region described in any one of FIGS. 1 to 6.

The present disclosure also provides a non-transitory computer-readable storage medium having a computer program stored thereon, and the computer program is configured to perform the method of configuring a control region described in FIG. 7.

The present disclosure also provides an apparatus for configuring a control region, configured in a base station working on an unlicensed spectrum, and the apparatus includes:

one or more processors and a memory for storing instructions executable by the one or more processors.

The one or more processors are configured to:

determine one or more channel detection subbands for configuring the control region;

generate control region configuration information corresponding to the one or more channel detection subbands; and transmit the control region configuration information to a terminal to perform a corresponding control signaling detection based on the control region configuration information.

Figure 24:
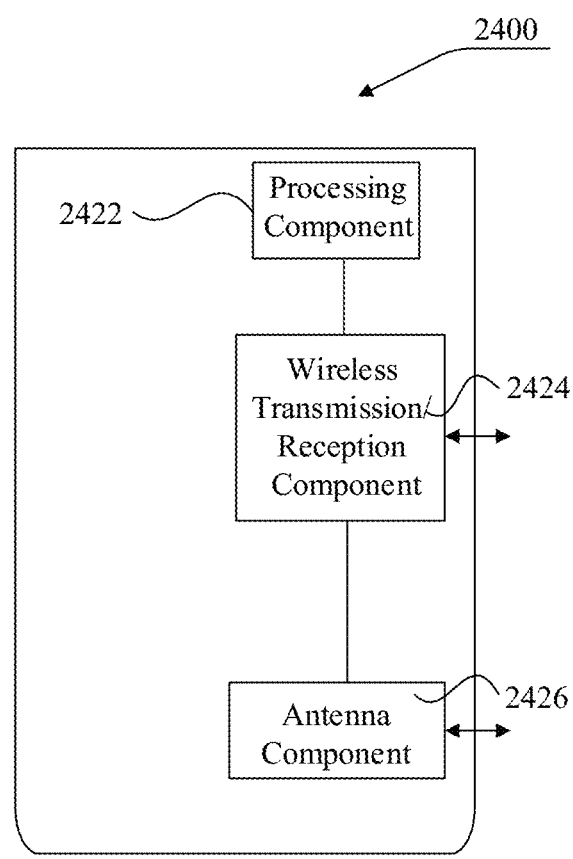
FIG. 24 is a structure schematic diagram of an apparatus for configuring a control region illustrated according to an example.

As illustrated in FIG. 24, it is a structure schematic diagram of an apparatus for configuring a control region illustrated according to an example. The apparatus 2400 may be provided as a base station. Referring to FIG. 24, the apparatus 2400 includes a processing component 2422, a wireless transmission/reception component 2424, an antenna component 2426, and a signal processing part peculiar to the wireless interface. The processing component 2422 may further include one or more processors.

One of the processors of the processing component 2422 may be configured to perform any one of the above methods of configuring a control region.

The present disclosure also provides an apparatus for configuring a control region, configured in a terminal working on an unlicensed spectrum, and the apparatus includes:

one or more processors and a memory for storing instructions executable by the one or more processors.

The one or more processors are configured to:

receive control region configuration information from a base station, where the control region configuration information is generated by the base station for one or more channel detection subbands for configuring the control region; and perform a corresponding control signaling detection based on the control region configuration information.

Figure 25:
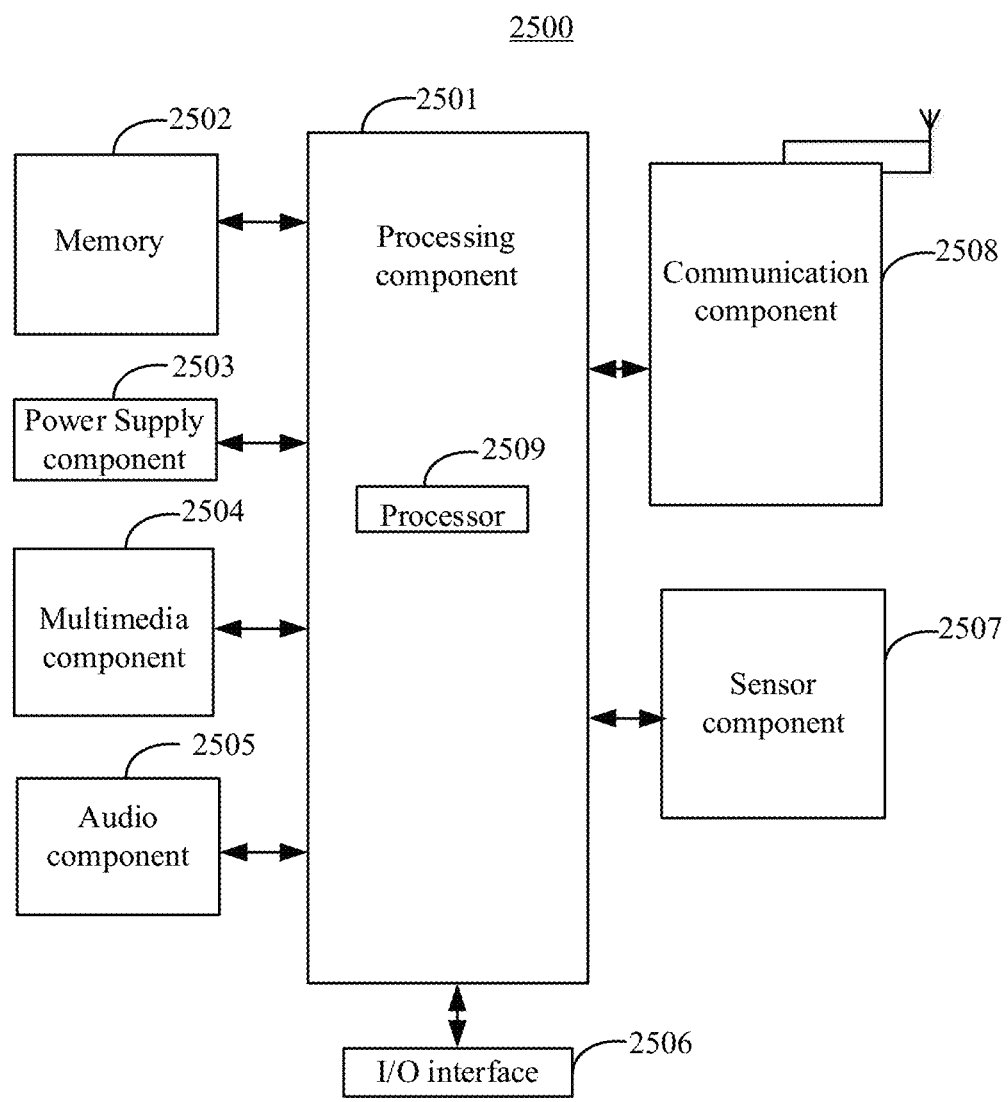
FIG. 25 is a structure schematic diagram of an apparatus for configuring a control region illustrated according to an example.

FIG. 25 is a structure schematic diagram of an apparatus for configuring a control region illustrated according to an example. As illustrated in FIG. 25, the apparatus 2500 for configuring a control region illustrated according to an example may be a terminal, such as a computer, a mobile phone, a digital broadcasting terminal, a messaging device, a game console, a tablet device, a medical device, fitness equipment, and a personal digital assistant.

Referring to FIG. 25, the apparatus 2500 may include one or more of the following components: a processing component 2501, a memory 2502, a power supply component 2503, a multimedia component 2504, an audio component 2505, an input/output (I/O) interface 2506, a sensor component 2507, and a communication component 2508.

The processing component 2501 generally controls the overall operations of the apparatus 2500, such as operations associated with display, phone calls, data communications, camera operations, and recording operations. The processing element 2501 may include one or more processors 2509 to execute instructions to complete all or part of the steps of the above method. In addition, the processing component 2501 may include one or more modules to facilitate interaction between the processing component 2501 and other components. For example, the processing component 2501 may include a multimedia module to facilitate the interaction between the multimedia component 2504 and the processing component 2501.

The memory 2502 is configured to store various types of data to support the operation of the apparatus 2500. Examples of such data include instructions for any application or method operated on the apparatus 2500, contact data, phonebook data, messages, pictures, videos, and the like. The memory 2502 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power supply component 2503 provides power to various components of the apparatus 2500. The power supply component 2503 may include a power supply management system, one or more power supplies, and other components associated with generating, managing, and distributing power for the apparatus 2500.

The multimedia component 2504 includes a screen providing an output interface between the apparatus 2500 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 2504 includes a front camera and/or a rear camera. The front camera and/or rear camera may receive external multimedia data when the apparatus 2500 is in an operating mode, such as a photographing mode or a video mode. Each front camera and rear camera may be a fixed optical lens system or have focal length and optical zooming capability.

The audio component 2505 is configured to output and/or input an audio signal. For example, the audio component 2505 includes a microphone (MIC) that is configured to receive an external audio signal when the apparatus 2500 is in an operating mode, such as a call mode, a recording mode, and a voice recognition mode. The received audio signal may be further stored in the memory 2502 or sent via the communication component 2508. In some examples, the audio component 2505 also includes a speaker for outputting an audio signal.

The I/O interface 2506 provides an interface between the processing component 2501 and a peripheral interface module. The above peripheral interface module may be a keyboard, a click wheel, buttons, or the like. These buttons may include but not limited to, a home button, a volume button, a start button and a lock button.

The sensor component 2507 includes one or more sensors to provide the apparatus 2500 with status assessments in various aspects. For example, the sensor component 2507 may detect an open/closed state of the apparatus 2500 and a relative positioning of components such as the display and keypad of the apparatus 2500, and the sensor component 2507 may also detect a change in position of the apparatus 2500 or a component of the apparatus 2500, the presence or absence of user contact with the apparatus 2500, orientation or acceleration/deceleration of the apparatus 2500, and temperature change of the apparatus 2500. The sensor component 2507 may include a proximity sensor configured to detect the presence of a nearby object without any physical contact. The sensor component 2507 may further include an optical sensor, such as a complementary metal-oxide-semiconductor (CMOS) or charged coupled device (CCD) image sensor which is used in imaging applications. In some examples, the sensor component 2507 may also include an acceleration sensor, a gyro sensor, a magnetic sensor, a pressure sensor, or a temperature sensor.

The communication component 2508 is configured to facilitate wired or wireless communication between the apparatus 2500 and other devices. The apparatus 2500 may access a wireless network based on a communication standard, such as Wi-Fi, 2G, 3G, or a combination thereof. In an example, the communication component 2508 receives broadcast signals or broadcast related information from an external broadcast management system via a broadcast channel. In an example, the communication component 2508 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Blue Tooth (BT) technology and other technologies.

In an example, the apparatus 2500 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above methods.

In some examples, there is also provided a non-transitory computer-readable storage medium including instructions, such as the memory 2502 including instructions executable by the processor 2509 of the apparatus 2500 to implement the above methods. For example, the non-transitory computer-readable storage medium may be a ROM, a random-access memory (RAM), a CD-ROM, a magnetic tape, a floppy disk, an optical data storage device, and the like.

When instructions in the storage medium are executed by the processor, the apparatus 2500 can execute any one of the methods of configuring a control region described above.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures illustrated in the drawings, and various modifications and changes can be made to the present disclosure without departing from the scope thereof. The scope of the present disclosure is to be limited only by the appended claims.

What is claimed is:

1. A method of configuring a control region, performed by a base station working on an unlicensed spectrum, comprising:
    determining one or more channel detection subbands for configuring the control region;
    performing a channel detection for the one or more channel detection subbands to obtain a first channel detection result;
    adding the first channel detection result into control region configuration information that is generated corresponding to the one or more channel detection subbands;
    configuring one or more sets of physical downlink control channel (PDCCH) candidates corresponding to the one or more channel detection subbands, wherein
        each set of PDCCH candidates, in which characteristics are identical, is limited on one of the one or more channel detection subbands, and
        the sets of PDCCH candidates, between which the characteristics are different, correspond to different channel detection subbands;
        wherein the characteristic comprises at least one of an aggregation level or a downlink control information (DCI) type to be detected;
    generating second indication information for representing the one or more sets of PDCCH candidates;
    adding the second indication information into the control region configuration information;
    configuring a designated control resource set (CORESET) and a designated search space for a terminal, wherein the designated CORESET is to be mapped on all or a part of the one or more channel detection subbands, and the designated search space covers the one or more sets of PDCCH candidates with the various characteristics;
    transmitting the designated CORESET and the designated search space to the terminal through high layer signaling; and
    transmitting the control region configuration information to the terminal to perform a corresponding control signaling detection based on the control region configuration information.

2. The method according to claim 1, further comprising:
    acquiring a correspondence between pre-defined channel detection results for the one or more channel detection subbands and pre-defined control resource set (CORESET) configurations, wherein the channel detection result comprises that the channel detection for each of the one or more channel detection subbands is successful or failed; and
    transmitting the correspondence to the terminal to determine a first CORESET configuration corresponding to the first channel detection result based on the correspondence.

3. The method according to claim 1, further comprising:
acquiring a correspondence between pre-defined channel detection results for the one or more channel detection subbands and pre-defined control resource set (CORESET) configurations, wherein the channel detection result comprises that a channel detection for each of the one or more channel detection subbands is successful or failed; and
adding the correspondence into the control region configuration information.

4. The method according to claim 1, further comprising:
configuring one or more search spaces corresponding to the one or more channel detection subbands, wherein each of the one or more search spaces is limited on one of the one or more channel detection subbands, and different search spaces correspond to different channel detection subbands;
generating first indication information for representing the one or more search spaces; and
adding the first indication information into the control region configuration information.

5. The method according to claim 4, further comprising:
configuring a designated control resource set (CORESET) for the terminal, wherein the designated CORESET is to be mapped on all or a part of the one or more channel detection subbands; and
transmitting the designated CORESET to the terminal through high layer signaling.

6. A method of configuring a control region, performed by a terminal working on an unlicensed spectrum, comprising:
receiving control region configuration information from a base station, wherein the control region configuration information is generated by the base station for one or more channel detection subbands for configuring the control region;
wherein the control region configuration information comprises a first channel detection result obtained from a channel detection performed by the base station for the one or more channel detection subbands;
wherein the control region configuration information further comprises second indication information about one or more sets of physical downlink control channel, PDCCH, candidates configured by the base station for the one or more channel detection subbands, wherein each set of PDCCH candidates, in which characteristics are identical, is limited on one of the one or more channel detection subbands, and
the sets of PDCCH candidates, between which the characteristics are different, correspond to different channel detection subbands;
wherein the characteristic comprises at least one of an aggregation level or a downlink control information (DCI) type to be detected;
acquiring a designated control resource set (CORESET) and a designated search space that are pre-configured by the base station for the terminal, wherein the designated CORESET is to be mapped on all or a part of the one or more channel detection subbands, and the designated search space covers the one or more sets of PDCCH candidates with the various characteristics;
determining, among all or the part of the one or more channel detection subbands on which the designated CORESET is mapped, a channel detection result that a channel detection for a second channel detection subband is successful;

determining a first characteristic of the set of PDCCH candidates corresponding to the second channel detection subband based on the control region configuration information; and
detecting, in a part of the designated search space that is on the second channel detection subband, the set of PDCCH candidates with the first characteristic corresponding to the second channel detection subband.

7. The method according to claim 6, further comprising:
receiving, from the base station, a correspondence between pre-defined channel detection results for the one or more channel detection subbands and pre-defined control resource set (CORESET) configurations, wherein the channel detection result comprises that the channel detection for each of the one or more channel detection subbands is successful or failed;
determining a first CORESET configuration corresponding to the first channel detection result based on the correspondence; and
performing the control signaling detection based on the first CORESET configuration.

8. The method according to claim 6,
wherein the control region configuration information further comprises: a correspondence between pre-defined channel detection results for the one or more channel detection subbands and pre-defined control resource set (CORESET) configurations, wherein the channel detection result comprises that a channel detection for each of the one or more channel detection subbands is successful or failed; and
wherein the method further comprises:
performing the channel detection for the one or more channel detection subbands to obtain a second channel detection result;
determining a second CORESET configuration corresponding to the second channel detection result based on the correspondence; and
performing the control signaling detection based on the second CORESET configuration.

9. The method according to claim 6,
wherein the control region configuration information further comprises first indication information about one or more search spaces configured by the base station for the one or more channel detection subbands, wherein each of the one or more search spaces is limited on one of the one or more channel detection subbands, and different search spaces correspond to different channel detection subbands; and
wherein the method further comprises:
performing the control signaling detection in the one or more search spaces corresponding to the one or more channel detection subbands.

10. The method according to claim 9, wherein said performing the control signaling detection in the one or more search spaces corresponding to the one or more channel detection subbands comprises:
acquiring a designated control resource set (CORESET) pre-configured by the base station for the terminal, wherein the designated CORESET is to be mapped on all or a part of the one or more channel detection subbands;
determining, among all or the part of the one or more channel detection subbands on which the designated CORESET is mapped, a channel detection result that a channel detection for a first channel detection subband is successful;

determining the search space corresponding to the first channel detection subband based on the control region configuration information; and performing the control signaling detection in the search space corresponding to the first channel detection subband.

11. An apparatus for configuring a control region, configured in a base station working on an unlicensed spectrum, comprising:

one or more processors; and a memory for storing instructions executable by the one or more processors;

wherein the one or more processors are configured to:

determine one or more channel detection subbands for configuring the control region;

perform a channel detection for the one or more channel detection subbands to obtain a first channel detection result;

add the first channel detection result into control region configuration information that is generated corresponding to the one or more channel detection subbands;

configure one or more sets of physical downlink control channel (PDCCH) candidates corresponding to the one or more channel detection subbands, wherein each set of PDCCH candidates, in which characteristics are identical, is limited on one of the one or more channel detection subbands, and the sets of PDCCH candidates, between which the characteristics are different, correspond to different channel detection subbands;

wherein the characteristic comprises at least one of an aggregation level or a downlink control information (DCI) type to be detected;

generate second indication information for representing the one or more sets of PDCCH candidates;

add the second indication information into the control region configuration information;

configure a designated control resource set (CORESET) and a designated search space for a terminal, wherein the designated CORESET is to be mapped on all or a part of the one or more channel detection subbands, and the designated search space covers the one or more sets of PDCCH candidates with the various characteristics; and transmit the designated CORESET and the designated search space to the terminal through high layer signaling; and transmit the control region configuration information to the terminal to perform a corresponding control signaling detection based on the control region configuration information.

12. An apparatus implementing the method according to claim 6, configured in a terminal working on an unlicensed spectrum, comprising:

one or more processors; and a memory for storing instructions executable by the one or more processors;

wherein the one or more processors are configured to:

receive control region configuration information from a base station, wherein the control region configuration information is generated by the base station for one or more channel detection subbands for configuring the control region;

wherein the control region configuration information comprises a first channel detection result obtained from a channel detection performed by the base station for the one or more channel detection subbands;

wherein the control region configuration information further comprises second indication information about one or more sets of physical downlink control channel, PDCCH, candidates configured by the base station for the one or more channel detection subbands, wherein each set of PDCCH candidates, in which characteristics are identical, is limited on one of the one or more channel detection subbands, and the sets of PDCCH candidates, between which the characteristics are different, correspond to different channel detection subbands;

wherein the characteristic comprises at least one of an aggregation level or a downlink control information (DCI) type to be detected;

acquire a designated control resource set (CORESET) and a designated search space that are pre-configured by the base station for the terminal, wherein the designated CORESET is to be mapped on all or a part of the one or more channel detection subbands, and the designated search space covers the one or more sets of PDCCH candidates with the various characteristics;

determine, among all or the part of the one or more channel detection subbands on which the designated CORESET is mapped, a channel detection result that a channel detection for a second channel detection subband is successful;

determine a first characteristic of the set of PDCCH candidates corresponding to the second channel detection subband based on the control region configuration information; and detect, in a part of the designated search space that is on the second channel detection subband, the set of PDCCH candidates with the first characteristic corresponding to the second channel detection subband.

13. A communication system implementing the method according to claim 1, comprising the base station, wherein base station is configured to, after said determining one or more channel detection subbands for configuring the control region:

perform a channel detection for the one or more channel detection subbands to obtain a first channel detection result;

add the first channel detection result into control region configuration information that is generated corresponding to the one or more channel detection subbands;

configure one or more sets of physical downlink control channel (PDCCH) candidates corresponding to the one or more channel detection subbands, wherein each set of PDCCH candidates, in which characteristics are identical, is limited on one of the one or more channel detection subbands, and the sets of PDCCH candidates, between which the characteristics are different, correspond to different channel detection subbands;

wherein the characteristic comprises at least one of an aggregation level or a downlink control information (DCI) type to be detected;

generate second indication information for representing the one or more sets of PDCCH candidates;

add the second indication information into the control region configuration information;

configure a designated control resource set (CORESET) and a designated search space for a terminal, wherein the designated CORESET is to be mapped on all or a part of the one or more channel detection subbands, and the designated search space covers the one or more sets of PDCCH candidates with the various characteristics;

transmit the designated CORESET and the designated search space to the terminal through high layer signaling; and transmit the control region configuration information to the terminal, to thereby enable the terminal performing the corresponding control signaling detection.

14. The communication system according to claim 13, further comprising the terminal, wherein the terminal is configured to perform the corresponding control signaling detection based on the control region configuration information, thereby ensuring that a physical downlink control channel (PDCCH) is transmitted without crossing different channel detection subbands, and improving a transmission reliability of control signaling:

wherein performing the corresponding control signaling detection based on the control region configuration information comprises:

acquiring the designated control resource set (CORESET) and the designated search space that are pre-configured by the base station for the terminal;

determining, among all or the part of the one or more channel detection subbands on which the designated CORESET is mapped, a channel detection result that a channel detection for a second channel detection subband is successful;

determining a first characteristic of the set of PDCCH candidates corresponding to the second channel detection subband based on the control region configuration information; and detecting, in a part of the designated search space that is on the second channel detection subband, the set of PDCCH candidates with the first characteristic corresponding to the second channel detection subband.

* * * * *